United States Patent [19]

Wolf

[11] Patent Number: 5,517,605
[45] Date of Patent: May 14, 1996

[54] METHOD AND APPARATUS FOR MANAGING BROWSING, AND SELECTING GRAPHIC IMAGES

[75] Inventor: Richard J. Wolf, Crowley, Tex.

[73] Assignee: AST Research Inc., Irvine, Calif.

[21] Appl. No.: 104,784

[22] Filed: Aug. 11, 1993

[51] Int. Cl.$^6$ ........................................................ G06F 3/00
[52] U.S. Cl. ......................... 395/155; 395/156; 395/157; 395/600
[58] Field of Search .......................... 395/152, 154–161, 395/600, 146; 345/117–120

[56] References Cited

U.S. PATENT DOCUMENTS 5,093,907  3/1992  Hwong ..................................... 395/152

OTHER PUBLICATIONS

Microsoft Word, Microsoft Corp., 1991, screen pp. 1–6.
MacIntosh User's Guide, Apple Corp., 1992, 118–124.
Advanced Interface Design Guide, IBM Corp., Jun. 1989, pp. 63–81, 95–101.
Paint Shop Pro for Windows, JASC, 1992, Screen pp. 1–24.
Rozells, SuperPaint 3, 1992, pp. 1–44.
Desk Set Environment Reference Guide, Sun Microsystems, 1990, pp. 28–32.
Tonomura et al., "Content Oriented Visual Interface Using Video Icons for Visual Database Systems", IEEE, 1989, pp. 68–73.
HyperCard User's Guide, Apple Corp., 1989, pp. 1–185.
Microsoft Works User's Guide, Microsoft Corp., 1989, pp. 103–173.
Word Perfect, Word Perfect Corp., 1992, screen pp. 1–3.
Thompson et al., "FullWrite Professional", Ashton–Tate Corp., 1988, pp. 97–122.
MacDraw Pro User's Guide, Claris Corp., 1991, pp. 8–2 to 8–12.

Primary Examiner—Raymond J. Bayerl
Assistant Examiner—John E. Breene
Attorney, Agent, or Firm—Knobbe, Martens, Olson & Bear

[57] ABSTRACT

A graphics image management system registers each image in a graphical database which can be used to select and organize the images to generate a display record identifying images which meet certain user defined criteria. Each record contains a filename and contains an index name that does not need to be unique. The graphic image management system also includes a mechanism for displaying representations of each image on a display screen. The displayed graphic images can be scrolled in a picture browser window in any order as determined by the database. Index names may be used for selection of a graphical image in a combo box. In addition, a descriptive phrase can be associated with each image in order to further identify the image and these phrases can be searched to locate a particular image.

45 Claims, 17 Drawing Sheets

METHOD AND APPARATUS FOR MANAGING BROWSING, AND SELECTING GRAPHIC IMAGES

FIELD OF THE INVENTION

This invention relates generally to display of graphical images and, in particular, to apparatus and methods for retrieving and displaying a plurality of graphical images.

BACKGROUND OF THE INVENTION

It is becoming increasingly common for a computer user to own large numbers of graphic images. These may be generated by various applications such as drawing programs, paint programs, icon generators and bitmap editors. Alternatively, the images may be purchased for use with other programs such as "clip art" images for use in word processing programs and desktop publishing programs. Further, many programs include their own images which are displayed during program operation.

Graphic images are available in a variety of formats, such as bitmap, TIFF, PCX, ICO and other formats, which various formats are generally not compatible in the sense that they must each be displayed in a different manner. In addition, the term "images" can also include documents that are not comprised primarily of graphical material, but do have a pictorial representation. These images are typically stored as binary files in the computer's disk memory (or CD ROM) along with other files and programs of different types. In a modern computer system, most programs consist of a number of files and it is not uncommon for a user to have hundreds, and even thousands, of files on a single computer, especially since most computer systems typically have large storage disks on the order of 100–500 megabytes.

In the case of small personal computers such as the IBM PC manufactured by International Business Machines Corporation, Armonk, N.Y., and compatible computers, the dominant operating system is the MS-DOS operating system developed and sold by Microsoft Corporation, Redmond Washington. One significant limitation of the MS-DOS operating system is that file names are limited to a total of eight characters (excluding spaces) plus a three character file "extension". Therefore, it is difficult for a user to assign meaningful or descriptive names to stored images if there are many images. With the MS-DOS operating system it is possible to group and categorize the images by using directories and sub-directories to form a branching "path" to organize the images, but in many cases such an organization is not possible because images associated with specific programs generally must be located in predetermined locations relative to the programs.

Many prior art graphics programs utilize the MS-DOS file system for document storage and therefore, in order to display a particular image with a display program other than the program for which the image was designed, the user must know where to look for the image, in particular, the user must know the device on which the image is stored and the MS-DOS path specification. In addition, the user must be capable of identifying the image by use of the MS-DOS eight character file name plus 3 character extension. Finally, there exists no common, readily-available mechanism for viewing images prior to use.

Other prior art programs allow sequential display of graphic images (browsing) but do not have the capability of providing a textual search. In addition, most graphic browsing programs restrict available searches to one directory (usually the directory in which the graphic program is located) and all graphic documents must be available at the time of the search. Further these prior art graphic programs restrict their search to document types that are directly related to the application providing the search, therefore, the programs cannot be used to coordinate all graphic images in the entire system.

Accordingly, it is an object of the present invention to provide a method and apparatus for organizing and displaying images stored in various formats in various locations in a computer system.

SUMMARY OF THE INVENTION

The foregoing problems are solved and the foregoing objects are achieved in an illustrative embodiment of the invention in which a graphics management system registers each image in a graphical database. The database can be used to select and organize the images to generate a display record identifying images which meet certain user defined criteria. The graphic management system also includes a mechanism for displaying representations of each image on a display screen. The displayed images can be "scrolled" on the screen in any order as determined by the database. In addition, a descriptive phrase can be associated with each image in order to further identify the image and these phrases can be searched to locate a particular image.

BRIEF DESCRIPTION OF THE DRAWING

The above and further advantages of the invention may be better understood by referring to the following description in conjunction with the accompanying drawings, in which.

DETAILED DESCRIPTION OF THE PREFERRED EMBODIMENT

The inventive graphics management system provides for management of documents that have an identifiable pictorial representation or image by means of a single software application which can be accessed by a user either directly or indirectly from another program whenever the user desires to view the graphic images in such a document. As will hereinafter be described in detail, the illustrative application provides access to such documents through a combination of database access techniques, including textual searches, and pictorial display.

Figure 1:
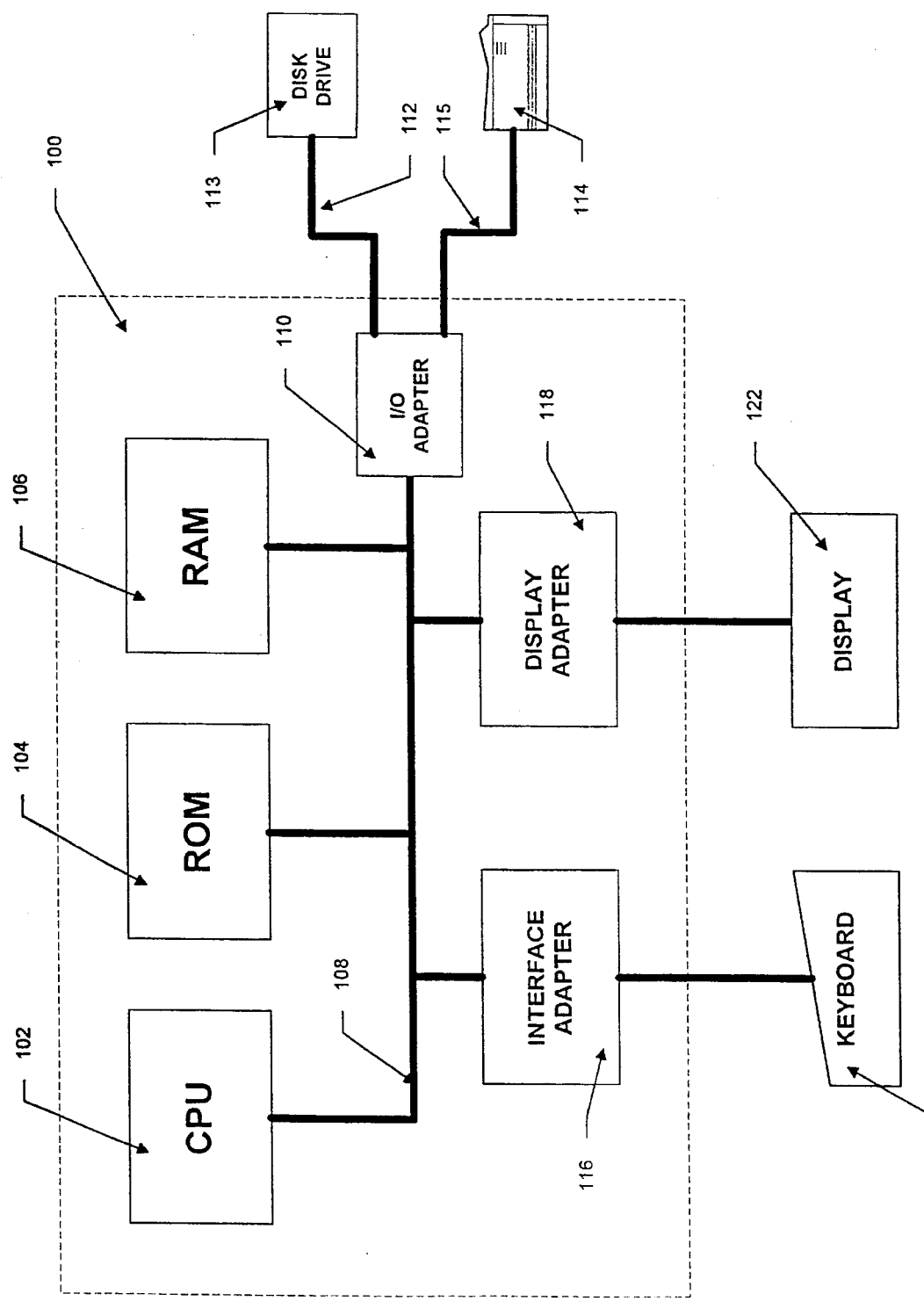
FIG. 1 is a block schematic diagram of an illustrative computer system on which the present invention can operate.

The invention is preferably practiced in the context of an operating system resident on a personal computer such as an IBM PS/2® or compatible computer. A representative hardware environment is depicted in FIG. 1, which illustrates a typical hardware configuration of a computer 100 in accordance with the subject invention. The computer 100 is controlled by a central processing unit 102, which may be a conventional microprocessor; a number of other units, all interconnected via a system bus 108, are provided to accomplish specific tasks. Although a particular computer may only have some of the units illustrated in FIG. 1 or may have additional components not shown, most computers will include at least the units shown.

Specifically, computer 100 shown in FIG. 1 includes a random access memory (RAM) 106 for temporary storage of information, a read only memory (ROM) 104 for permanent storage of the computer's configuration and basic operating commands and an input/output (I/O) adapter 110 for connecting peripheral devices such as a disk drive 113 and printer 114 to the bus 108, via cables 115 and 112, respectively. A user interface adapter 116 is also provided for connecting input devices, such as a keyboard 120, and other known interface devices including mice, speakers and microphones to the bus 108. Visual output is provided by a display adapter 118 which connects the bus 108 to a display device 122, such as a video monitor. The workstation has resident thereon and is controlled and coordinated by operating system software such as the MICROSOFT MS-DOS® operating system sold by Microsoft Corporation, Redmond, Wash.

In the illustrative embodiment discussed below, the inventive graphics management system is designed to operate with the Microsoft WINDOWS® operating system which is an overlay to the MS-DOS operating system, although other operating systems and interfaces can also be used without departing from the spirit and scope of the present invention. The WINDOWS operating system provides the common operating system and user interface components used for menu management and input device operation and is a widely known and understood environment. Accordingly, the inventive graphics management system has been implemented as a Microsoft WINDOWS Application and runs as a task within this environment.

Since the Microsoft WINDOWS operating system is well-known, it will not be discussed in detail herein. However, some basic explanation will serve to clarify the operation of the inventive graphics management system. Specifically, application programs running within the WINDOWS environment do not directly access the system resources such as the display, the printer, the mouse or the keyboard. Instead, applications communicate with the WINDOWS operating system by means of pre-defined "messages" which can be generated either by the WINDOWS system or by the application program. The WINDOWS operating system then controls the system resources to carry out the requested task. For example, messages may be generated by the WINDOWS operating system in response to a menu selection, mouse movement, mouse button positions ("button up" and "button down" messages) and operation of keys on the keyboard. Alternatively, an application program can generate messages to cause information to be displayed on the screen, stored on disk or sent to the printer. The WINDOWS operating system also provides common system resources such as resizable windows in which information is displayed and input devices such as dialog boxes containing various user operable "controls" such as pushbuttons, list boxes, combo boxes and check boxes.

In addition, within the Microsoft WINDOWS environment, much of the application control processes which are normally found in the application program are instead implemented within the WINDOWS system itself. Consequently, application programs which operate in the WINDOWS environment do not have a continuous control structure, but instead consist of a set of message response functions, one of which is selected in response to a message received from the operating system by a "switch" statement. Therefore, in the following discussion, the inventive graphics management system will be described by discussion of selected message response functions. The interaction with the WINDOWS operating system will not be described in detail since this is conventional and well-known.

In accordance with tile principles of the present invention, images can be organized into "selection sets" by a variety of criteria including types, groups and word associations. The "types" and "groups" can be used in a hierarchical manner to organize the graphic images. For example, a "type" is an arbitrary designation for a collection of related pictures and a "group" is an arbitrary designation for a collections of related types. Images can belong to more than one type, but each type belongs to one group. In general, a group designation is used to restrict a selection set to those images that can be used with a particular application program. The selection set is generated by a database manager which produces a selection record based on the type and group information.

The illustrative graphics management system allows the user to choose a picture or document for use by a requesting application. It also allows a user to select and edit an image by means of an editing program that is associated with the picture type. Finally, the graphics management system allows a user to catalog pictures or documents as they are created or brought onto the system.

Figure 2:
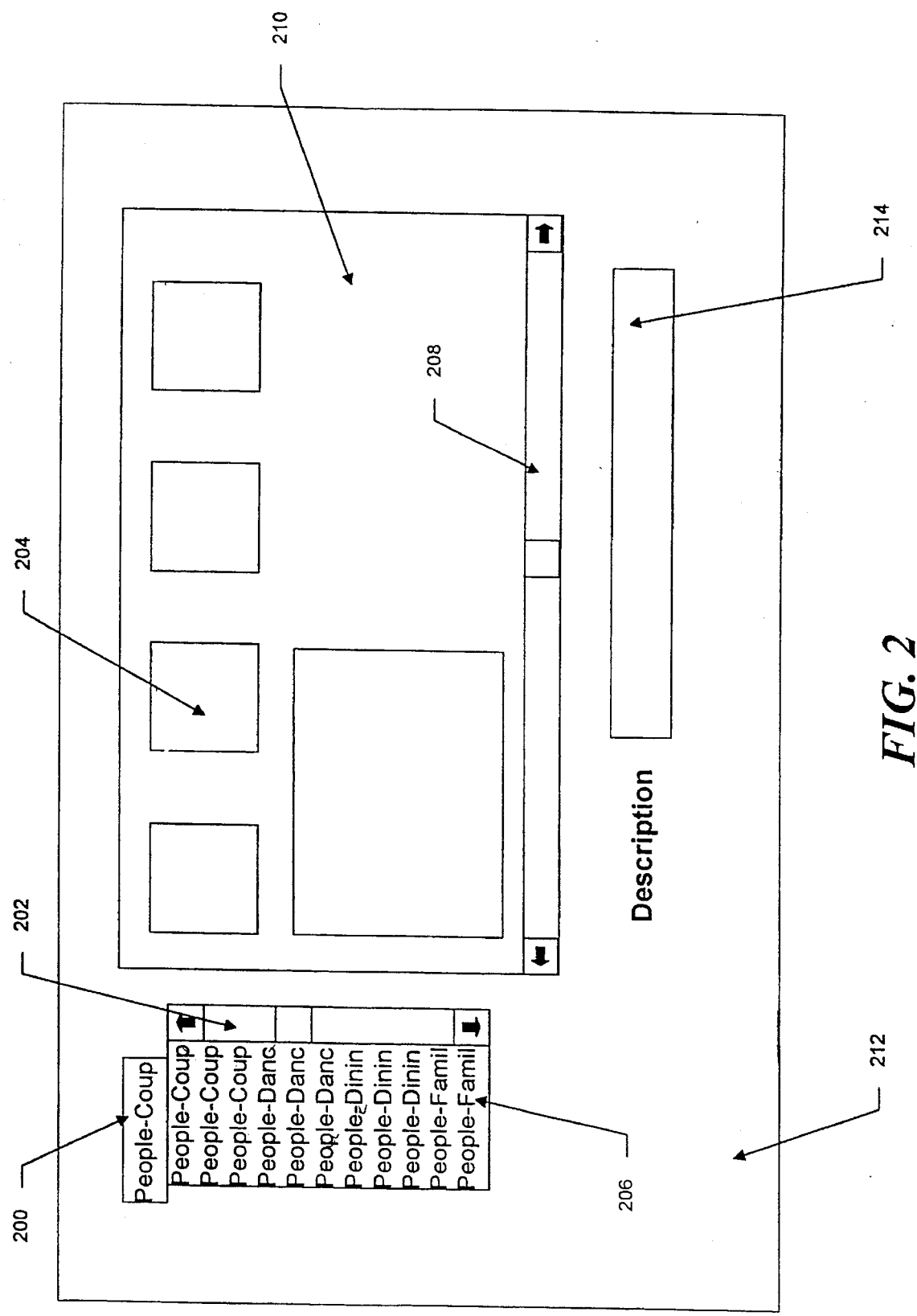
FIG. 2 is a schematic illustration of a typical display screen generated by the invention showing the file name list, the graphic presentation area and a possible descriptive phrase location.

FIG. 2 shows an illustrative screen display generated by the inventive graphics display method. There are three main components in the display 212—a picture browser area 210, an index box 206 and a picture description edit field 214. All three components display information about a file located somewhere within the user's file system. Although a file may be displayed even if there is no associated image, the graphics management system is generally only of interest if the file has some sort of pictorial representation. However, the file may also have some semantic information in addition to the pictorial representation. Two of the three components (the picture browser area 210 and the index box 206) display information about more than one file (hereafter referred to as a "picture") at one time. The description edit field 214 displays information about only one picture.

More specifically, the picture browser area 210 displays as many pictures 204 as can be shown within the current box size. The pictures can be different sizes as shown in FIG. 2. A user may scroll through the list of pictures in a set of pictures currently selected by using selected keys on the keyboard such as the arrow keys, the page down and page up keys or by using a mouse operating on the scroll bar 208. The picture browser area can allow scrolling in either direction depending on the relative aspect ratios of the pictures to be displayed and the window size of the picture browser area. However, to simplify the discussion for clarity, the picture browser area operation will be described herein as if it was only capable of scrolling in the horizontal direction.

The picture browser area display 210 is arranged in columns and rows of pictures. Each column of pictures is designated as a picture element. If a line of text within the index box 206 is also designated as a picture element, then both the browser area 210 and the index box 206 allow the user to scroll though a list of picture elements. Thus, there are two conceptual differences between the index box 206 and the picture browser 210: 1) the index box 206 displays text while the picture browser area 210 displays pictures and 2) the index box displays only one text line per picture element whereas there may be more than one picture per picture element displayed in the picture browser area 210. A displayed picture can also be "selected" with either the mouse or the keyboard with the selected picture indicated in the browser area 210 in any conventional manner such as by "highlighting" the picture element border or displaying the picture border in a predetermined color.

The graphics management system may operate as a "primary" application that allows a user to directly view pictures and to organize a collection of pictures efficiently. In this type of operation, the selection of a picture can invoke an associated program called an editor, which program typically allows a user to change the content of the picture in a manner determined by the implementation of the editor. Within the WINDOWS environment, two methods are generally provided to edit a picture—direct editing which involves the provision of the picture's filename on a command line and indirect editing of a picture located in another application using a special protocol called the "object linking and embedding protocol (OLE) protocol to invoke the other application. Operation as a primary application then allows the graphic management system to serve as a pictorial browser for other programs written completely independently of the graphic management system.

Alternatively, the graphics management system can act as a "subordinate" application that can display pictures when requested by another application. When the graphics management system is operated in this manner, the path name of the chosen file is provided to the graphics management system at the conclusion of a predefined protocol "conversation" between another program and the graphics management system. The requesting application can request that the graphics management system provide the original file or a copy of that file. This latter type of operation can be implemented based upon a WINDOWS dynamic data exchange protocol (DDE) with a simple request-response semantic. As this protocol is well-known, it will not be discussed further herein.

The index box 206 displays the "names" of the pictures in the current selection set. The names are arbitrary textual identifiers that can be assigned to the pictures and need not be related to the MS-DOS file name. Consequently, although the assigned names are restricted in length, that restriction is based on the length which can be viewed in the index box 206 rather than the MS-DOS file name restrictions. The assigned names are associated one-for-one with the pictures but the names do not have to be unique. In one illustrative implementation, the index box operates as a standard "combo" box object found in the WINDOWS graphical interface. The operation of this object is well-known and described in many publications covering the WINDOWS system. The names in displayed in the object box can be scrolled by "clicking" on the scroll bar 202 with a mouse or the keyboard keys can also be used in a standard fashion. A name in the list section of the box can be selected in a known fashion by using the mouse or keyboard and the selected name appears in the edit box 200 where the name can be edited.

The description field 214 contains arbitrary text that a user can enter to further define a selected picture. The description is associated with the selected picture by the database as will hereinafter be defined.

All three components have in common that they display, at any given time, only a portion of the actual information that the user may wish to view. Therefore, the underlying files may be quite large. Each component will determine whether it is capable of displaying newly-requested information and will retrieve that information as required to comply with the request. The components may discard information when it is no longer required.

Figure 3:
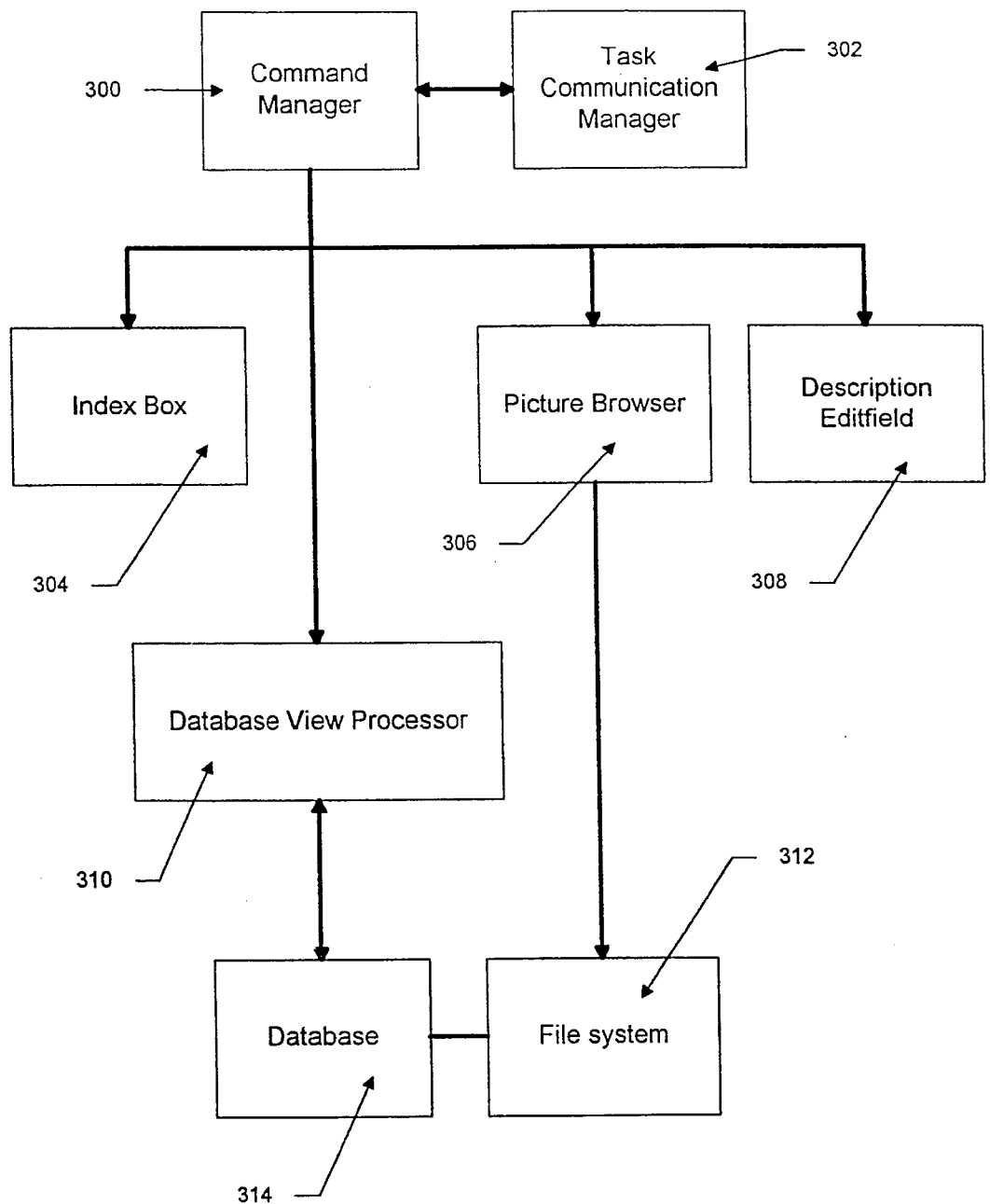
FIG. 3 is a block schematic diagram illustrating connections and relations between various parts of the inventive graphics management system.

FIG. 3 indicates the various modules and interconnections which comprise an illustrative embodiment of the inventive graphics management system. The interface between the graphics management system and the WINDOWS operating system is handled by task communication manager module 302 which receives and generates the communications messages that are transferred between the graphics management system and the WINDOWS operating system. A selected subset of these messages are discussed in detail below and the details of the message form and the exact transfer mechanism are not important to the invention and will not be discussed further herein. Additional messages are necessary for the graphics management system to fully communicate with WINDOWS, but these latter messages are of a standard variety which are familiar to those operating in the WINDOWS environment.

The task communication manager 302, in turn, communicates with a command manager 300 and the command manager 300 responds to the messages generated both by the task communication manager 302 and by other modules in the system. These various internal messages may be implemented as true messages or as internal subroutine calls generated by the graphics management system. In the discussion which follows the internal messages are described as actual messages.

In response to the messages, the command manager 300 generates a series of commands which are used to control the various user interface objects, including the index box 304, the picture browser area 306 and the description edit field 308, as well as a database view processor 310 that interfaces with the database 314.

The database view processor 310 is controlled by the command manager 300 to interact with database 314 to assemble a selection set of pictures which can be displayed by the inventive graphics management system. The database view processor is 310 formulates a query which directs the database 314 to identify the selected picture files and retrieve the filenames from the file system 312.

More specifically, the information in the index box 304, the picture browser area 306 and the description edit field 308 is "combined" by means of the underlying database 314 that relates the information through the notion of a common picture "record". The database 314 contains a plurality of records, each of which comprises, among other things, the file system location (filename) of each picture as well as the picture name (the name that is displayed in the index box) and the picture description (the text that is displayed in the description edit field) associated with each picture. This combination gives the user a more sophisticated organization technique since a picture name and picture description can be "unrestricted" relative to common file name limitations. Also, pictures may be cataloged by several different types (views) because duplicates are allowed in both the picture name and the picture description. Accordingly, common database query techniques can be utilized to provide for dynamic organization capabilities though utilization of the text contained in the name and description components of the database record.

The requirements of the database 314 are simply that it be capable of organizing data into multiple "views" each consisting of a logical subset of all records. The ordinal position within this subset is referred to as the "index" of the associated picture record. The illustrative embodiment consists of a three-level hierarchical organization with picture records being organized first by user, then by type and finally sorted by name. Database view processor 310 and database 314 may comprise any of the well-known and presently-available commercial database systems which operate on personal computers, including PARADOX sold by Borland International, Inc.; dBASE sold by Ashton-Tate Corporation, ACCESS sold by Microsoft Corporation and others.

The command manager 300 also controls the user interface objects including the index box 304, the picture browser area 306 and the description edit field 308 - the operation of these latter three objects has been previously discussed. The picture browser area 306 interfaces directly with the file system 312 to retrieve picture files whose file name has been identified by the database view processor as will be discussed in detail hereinafter. In accordance with another aspect of the invention, the actual pictorial contents of the picture file are displayed rather than a "thumbnail" representation which is displayed by some prior art systems. The actual pictorial display produces a truly correct display and allows the user to choose the display size that is appropriate. A "zoom" command allows a picture to be displayed at full window size.

As previously mentioned, the inventive graphics management system comprises a set of message response functions which enable the system to interface with the WINDOWS operating system. The description which follows is a discussion of the main message response functions which implement the graphics management system. The messages that are discussed in detail are listed below in TABLE 1. Some of the messages receive parameters which are then used in subsequent processing. Those message response functions which receive parameters are also noted below.

TABLE 1

| Message | Parameter |
| --- | --- |
| NewSelection | Index of item to be next selected |
| NewSize | size of component window (operating system specific) |
| MouseButtonDown | location of mouse pointer |
| MouseDoubleClick | none |
| MotionKey | identity of key pressed (arrow or page up/down) |
| SelectAndGo | none |
| Zoom | none |
| NewGroup | group identifier |
| PictureSave | group identifier |
| PictureAdd | group identifier |
| Scroll | Index of new picture element |
| RefreshContents | none |

Also, in the following description, the definitions set forth in TABLE 2 below will be used:

TABLE 2

| Term | Definition |
| --- | --- |
| Database | used as is common in the literature. Most any hierarchical or relation database would suffice. |
| View or selection set | a subset of the picture records within the database presented as though they comprise a sequential and consecutive set of records. |
| Type | a user defined view as defined by the database hierarchy rather than a query. |
| Group | a collection of types that are similar (usually share a common editor); a program defined within the type that can process the files contained within the type. |
| Index | the ordinal position within the current view of a record associated with a picture. |
| Selection | the index of the picture that is currently highlighted in the index box or the picture browser area or whose description is displayed in the description edit field. |
| Double click | two mouse clicks in the same place in rapid succession. This results in a MouseButton message followed by a MouseDoubleClick message. |
| Choice | the user makes a choice of the currently selected picture by using a menu command, clicking on a choice button or double clicking on the desired picture or name. |
| Picture element | a line of text in the index box or a column of pictures in the picture browser or the description displayed in the description edit field. |

TABLE 2-continued

| Term | Definition |
| --- | --- |
| User Record | a record containing various status information concerning the user such as the type and index of the last picture viewed. |

Figure 4:
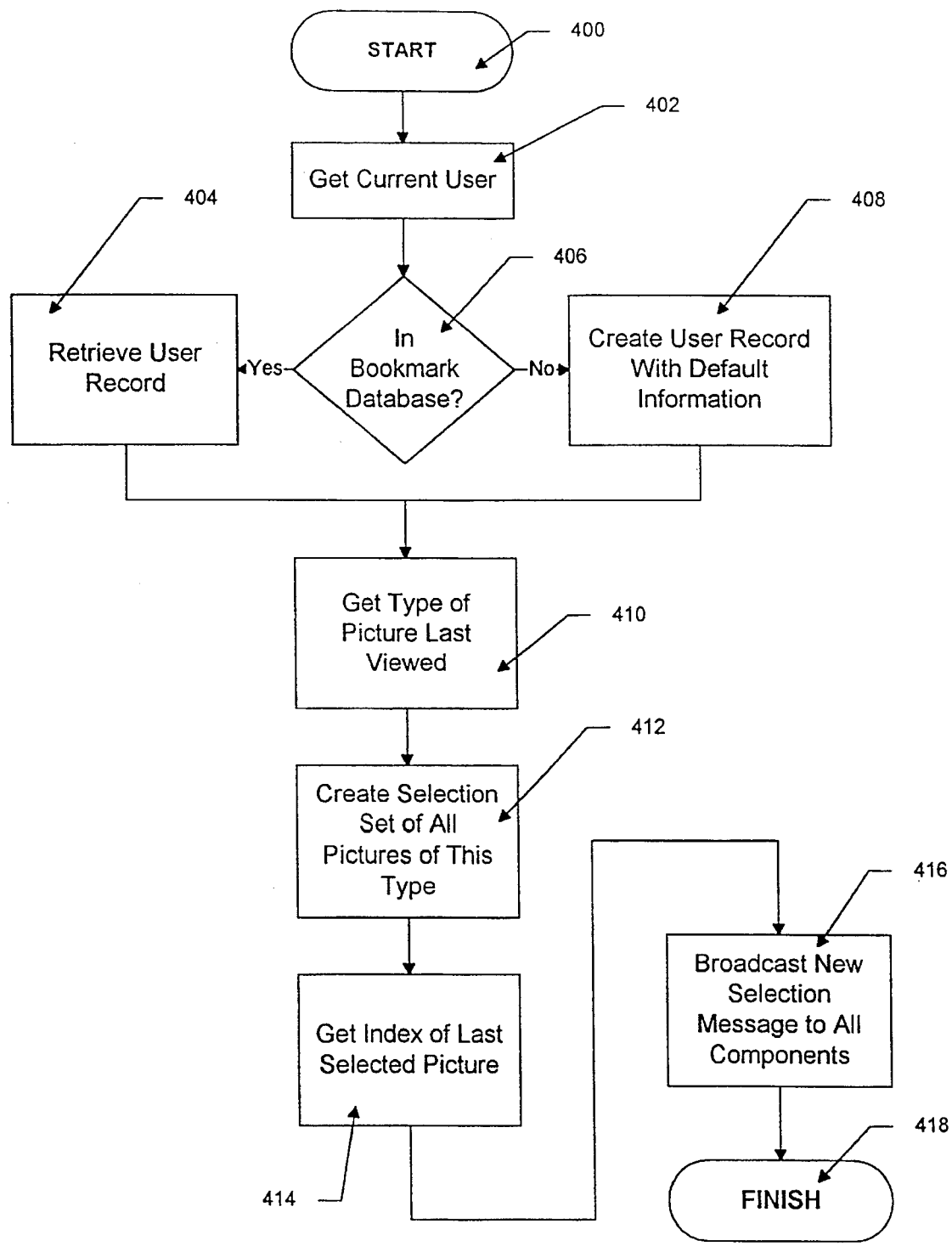
FIG. 4 is a flowchart of an illustrative initialization routine.

It should be noted that in tile picture browser area (210, FIG. 2) there can be more that one picture within a picture element (column of pictures). There is one picture for each row, and, thus, the index of the currently-selected picture is given by the formula:

$$index = nElement * nRows + iRow$$

where nElement is the number of the picture element containing the currently-selected picture: nRows is the number of rows currently displayed in the picture browser area and iRow is the row number of the currently-selected picture and all numbers are zero-based FIG. 4 is a flowchart of an illustrative initialization routine used by the command manager (300) to initialize the graphics management system in preparation for displaying a selection set of pictures. The illustrative routine begins in step 400 and proceeds to step 402 where an identification of the current user is obtained. This identification may for example, be stored in a routine "housekeeping" section of the computer memory reserved for the graphics management system or the user may be required to enter identification information when the graphics management system begins operation.

The routine then proceeds to step 406 in which a check is made to determine whether the user has placed an entry in a "Bookmark Data base". The bookmark database is a persistent storage area in which a user can store a user record which includes various parameters such as the current type and index values. This information enables a user, upon starting the graphics management system to quickly return to a previous display area. If the user does not have an entry in the bookmark data base, the routine proceeds to step 408 in which a user record is created with default information as to the type and index values. Alternatively, if an entry for the user is found in the bookmark database, then the user record is retrieved in step 404.

In either case the routine then proceeds to step 4 10 in which the type of the last picture viewed is obtained from either the retrieved user record or the default information in the created user record.

The command manager uses tile type retrieved in step 410 to control the database view processor (310) which, in turn, operates the database (314) to create a selection set of all pictures of the same type as indicated in step 412. The operation of the database view processor 3 10 and the database 314 is conventional and will not be described in detail. In particular, there are several methods of constructing such a selection set consisting of pictures of a single type. In the illustrative embodiment, the type may be part of a "key" which is used to retrieve records and thus the selection sets are formed by the inherent operation of the database. Alternatively, a "query" command can be issued to the database view processor 310 which then causes the database 314 to initiate a selection of the files in the file system 312 to generate the selection set desired in step 412.

After creating a selection set, tile routine proceeds to step 414 where the index of the picture last viewed is obtained from the user record retrieved in step 404 or created in step 408. The index value is used to select one of the pictures in the selection set.

The routine then proceeds to step 4 16 where a NewSelection message is created using the index value retrieved in step 4 14 as a parameter. This message is broadcast to all of the graphics management system components including the index box 304, the picture browser area 306 and the description edit field 308. As will hereinafter be described in detail, the NewSelection message sets up the display components that display the new selection which is obtained frown tile database. The routine then finishes in step 4 18.

Figure 5:
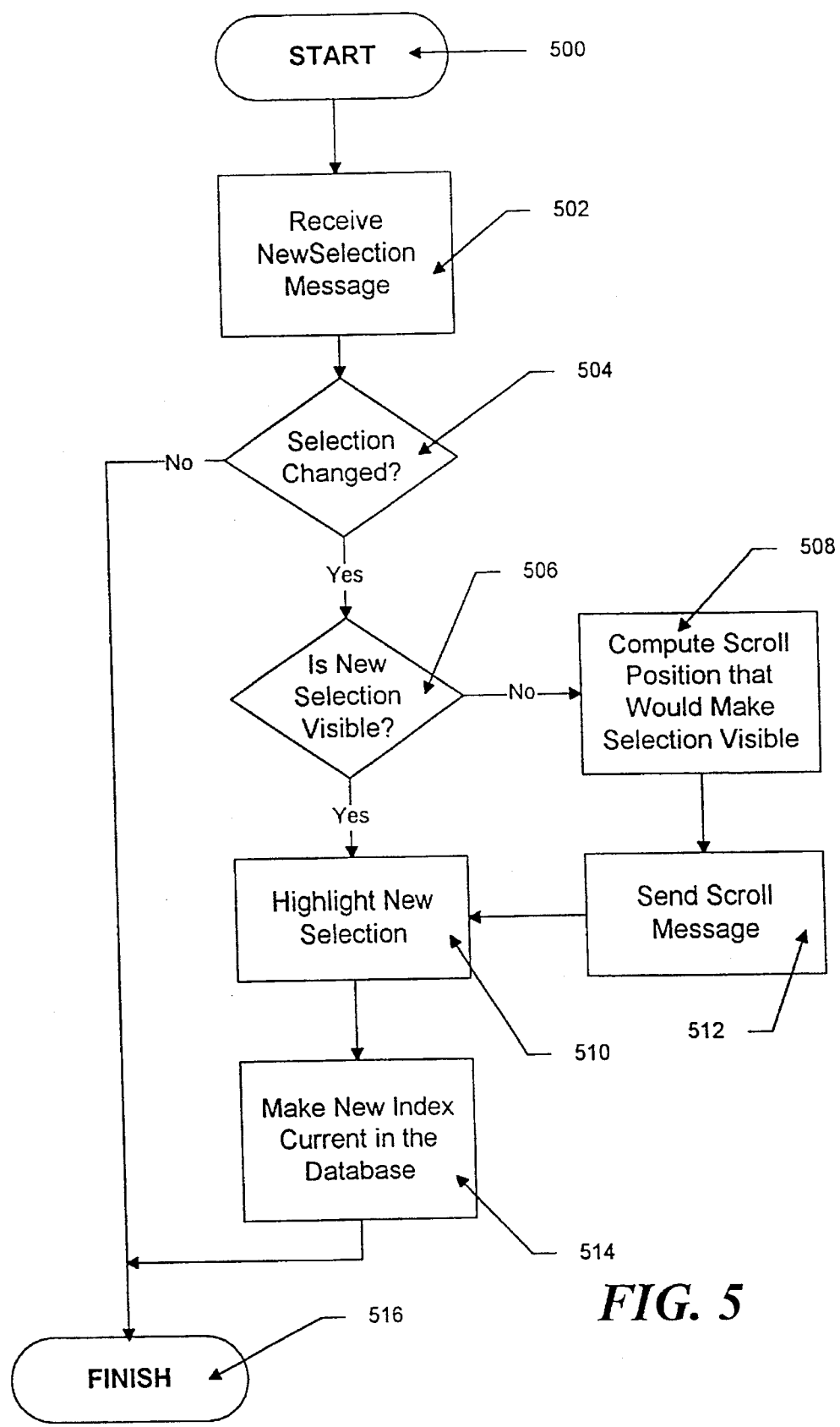
FIG. 5 is a flowchart of an illustrative routine used to process NewSelection messages.

The processing of a NewSelection message by the graphics management system display components is shown in detail in FIG. 5. In particular, the routine starts in step 500 and proceeds to step 502 where the NewSelection message is received by each component. In step 504, the index value parameter of the new selection message is compared to the index value of the picture already selected. This step is necessary because it is possible for the user to reselect an already selected picture. If the index value has not changed, the routine is finished in step 5 16.

Alternatively, if tile selection has changed, the routine proceeds to step 506 in which a check is made to see whether the new selection is already visible in the picture browser area. As previously mentioned, the display screen is capable of displaying a number of picture with the total number depending on the size of the picture browser area window. Therefore, it is possible that the new selection is already displayed on the display screen. If it is, then the routine proceeds to step 5 10 where the new selection is highlighted for example, by changing the color of the board or the background or by some other conventional means.

The routine then proceeds to step 5 14 where the index value corresponding to the new selection is supplied to the database which then makes the new record the "current" record in the database. The routine then ends in step 516.

Alternatively, in step 506 if the new selection is not visible on the display screen, then the routine proceeds to step 508, in which a new scrolling position that would make the selection visible is computed. In particular, the size of each picture in both the horizontal and vertical directions is stored in the database along with the picture information and this information is retrieved from the database and used to compute the scroll distance (allowing for margins between pictures). It is then necessary to scroll the new selection onto the display screen when the scroll positions have been computed in step 508. In order to perform this scrolling, a scroll message is sent to the picture browser and the index box in step 5 12 causing them to scroll to the new position.

The new selection is then highlighted in step 5 10 and the new index corresponding to the new selection is made current in the data base in step 514. The routine ends in step 516.

Figure 6:
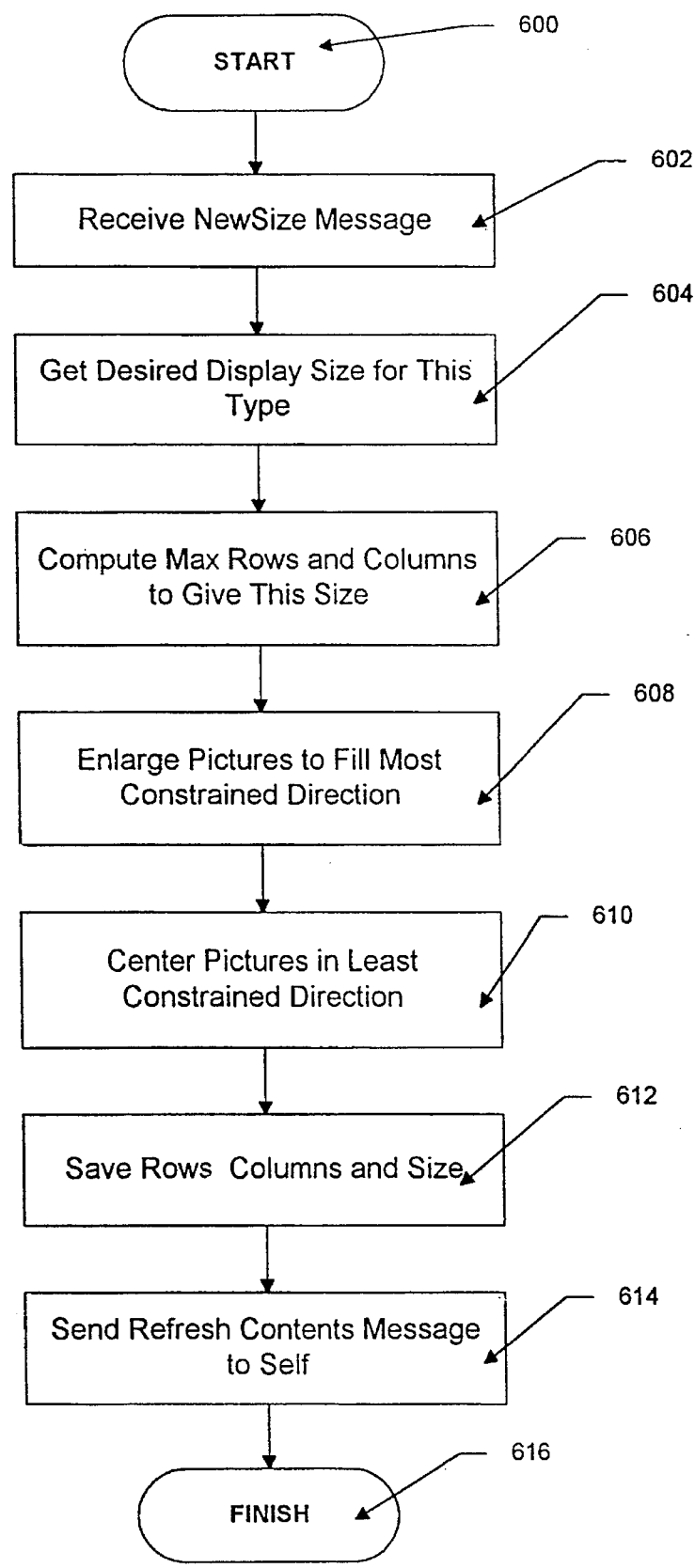
FIG. 6 is a flowchart of an illustrative routine used to redraw and reposition the displayed images in response to a NewSize message.

FIG. 6 is a flowchart of a routine used by the picture browser area to process an incoming NewSize message. Since the picture browser area is implemented in the illustrative embodiment as a "window" in the WINDOWS operating system, it can be moved and resized. When the user indicates that the window should be resized in a conventional manner, the WINDOWS operating system generates a NewSize message and forwards it to the graphics management system.

In particular, the NewSize routine starts in step 600 and proceeds to step 602, where the NewSize message is received by the picture browser area. In step 604, either the database (or, alternatively, the user record retrieved or created during the initialization procedure) is interrogated to obtain a desired display size for the type of pictures being displayed. Next, the routine proceeds to step 606, where the actual window size of the picture browser area is utilized along with the desired displayed size for the picture type to compute the maximum number of rows and columns which will be visible in the picture browser area.

In step 608, the pictures are enlarged to fill the picture browser window in the most "constrained" direction. As previously mentioned, the pictures need not be square and, in fact, may be different sizes. Accordingly, picture size in either the horizontal direction or the vertical direction may be larger. The direction in which the largest picture dimension occurs is considered the constrained direction. The pictures are enlarged in order to fill the display screen in this direction, and, in step 610, the pictures are centered in the least constrained direction to make the display relatively symmetrical and pleasing to the eye.

In step 6 12, the number of rows and columns and the desired display size are saved and, in step 614, a RefreshContents message is sent from the picture browser area to itself, which message, as will be hereinafter explained, causes the pictures to be redisplayed at the new size. The routine then ends in step 616.

Figure 7:
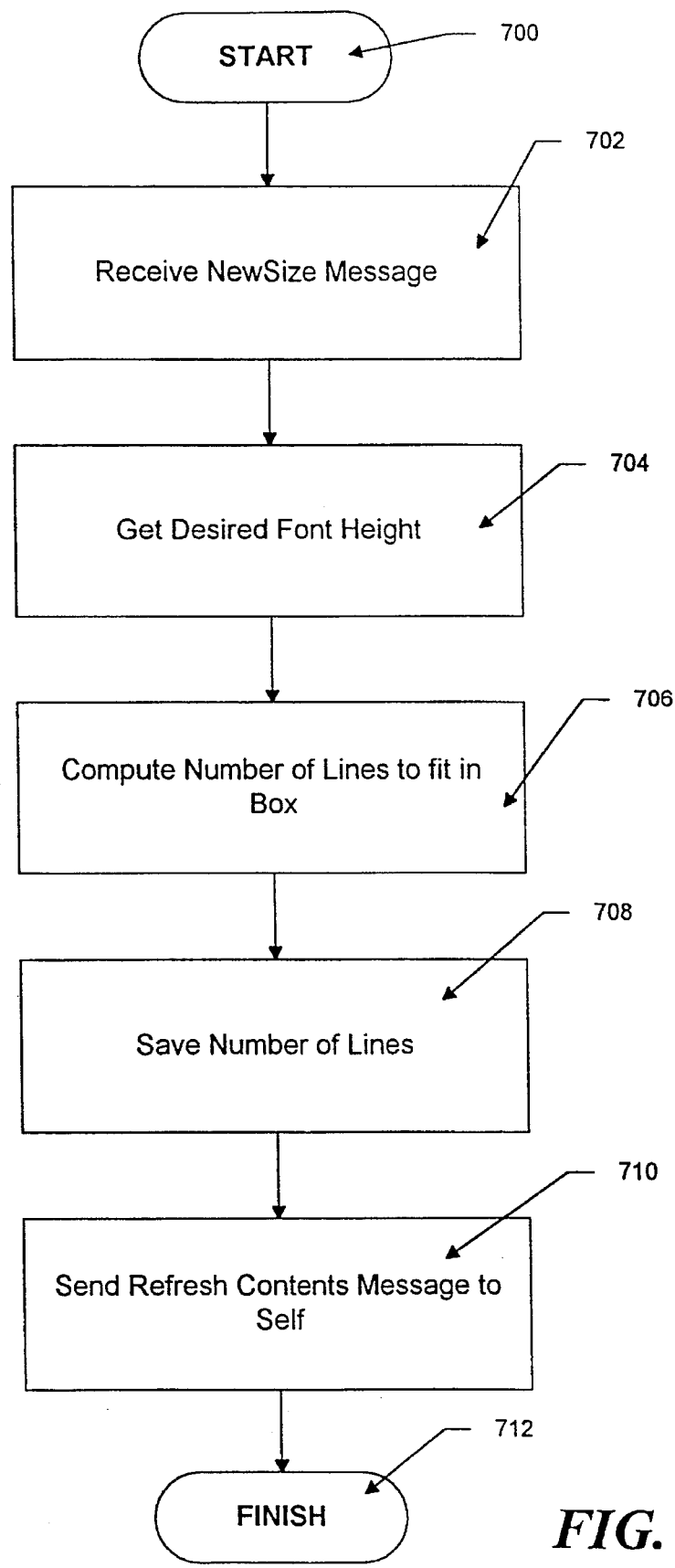
FIG. 7 is a flowchart of an illustrative routine used to redraw the image index box in response to a NewSize message.

FIG. 7 shows a companion routine to that shown in FIG. 6 which routine is used by the index box to process a NewSize message. In particular, the routine proceeds from step 700 to step 702 where the NewSize message is received by the index box. In step 704, the desired font height of the text to be displayed in the box is retrieved from the WINDOWS operating system. This font height is determined by default settings in the WINDOWS operating system depending on the size and font of the characters shown in the index box.

In step 706, the font height retrieved in step 704 is used to compute the maximum number of lines which will fit into the box as displayed in the screen. The computed number of lines is saved in step 708 and a RefreshContents message is sent by the index box to itself to cause the new lines to be displayed as shown in step 710. The routine then ends in step 712.

Figure 8:
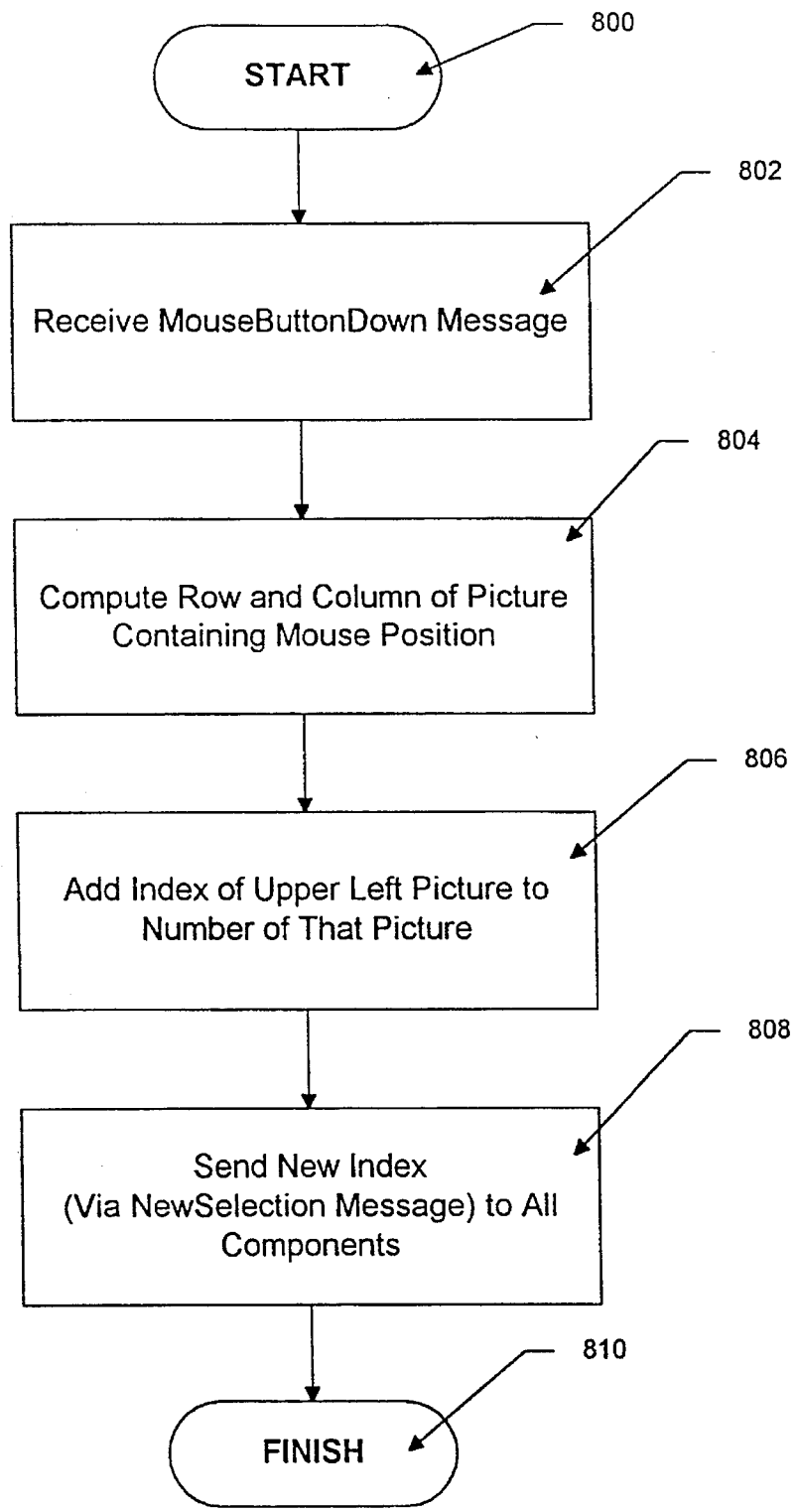
FIG. 8 is a flowchart of an illustrative routine used to process a MouseButtonDown message generated with the mouse positioned inside the male display area.

FIG. 8 shows a flowchart of a routine used by the picture browser area to process MouseButtonDown messages. This routine accepts as a parameter the mouse position and computes a new index corresponding to the new picture selected. The routine starts in step 800 and proceeds to step 802 where the MouseButtonDown message is received. In step 804, the row number and column number of the picture containing the mouse position are computed. In this regard, it should be noted that the row and column numbers are relative to the picture browser window and not to the ordinal of the database record (the index). Thus, if eINDEX is the ordinal of the first picture element displayed in the picture browser window, then the index of the first picture element (or the ordinal of the database record) is given by:

index=eINDEX*nROWS+column*nROWS+row where nROWS is the total number of rows displayed in the picture browser window, column is the column number containing the mouse position and row is the row number containing the mouse position.

The routine then proceeds to step 806 where a new index is computed by adding the index of the upper left picture in the picture browser area to the number of that picture. In step 808, the new index is communicated to all graphics management system components via a NewSelection message (the processing of that message has been previously described). The routine then finishes in step 810.

Figure 9:
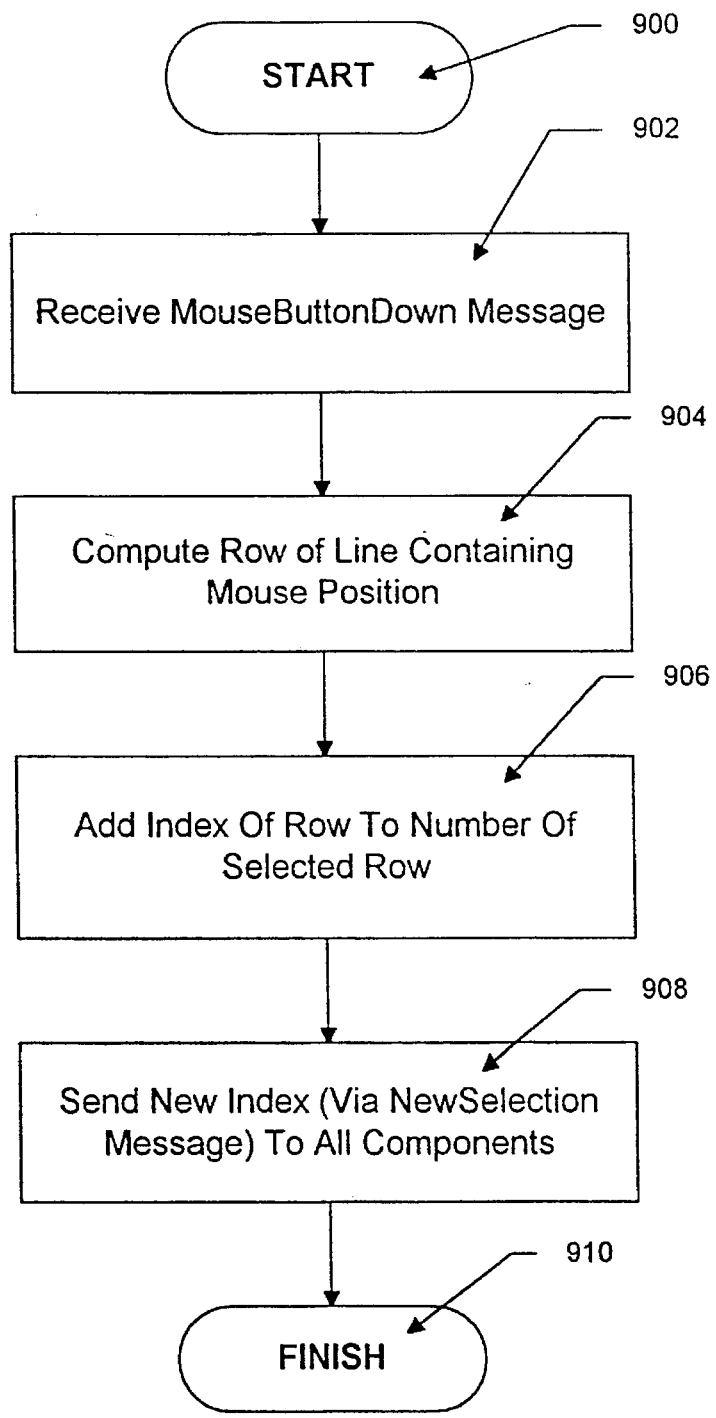
FIG. 9 is a flowchart of an illustrative routine used to process a MouseButtonDown message generated with the mouse positioned inside the index box area.

FIG. 9 shows an illustrative routine used by the index box to process MouseButtonDown messages. In particular, the routine starts in step 900 and proceeds to step 902 where the MouseButtonDown message is received by the index box. In line 904, the row number of the line containing the mouse position is computed and, in step 906, a new index value is computed by adding the index of the record containing the picture identified in the selected row to the number of the selected row. This new index is used, in step 908, to broadcast a NewSelection message to all components (which is processed as previously described). The routine then ends in step 9 10.

Figure 10:
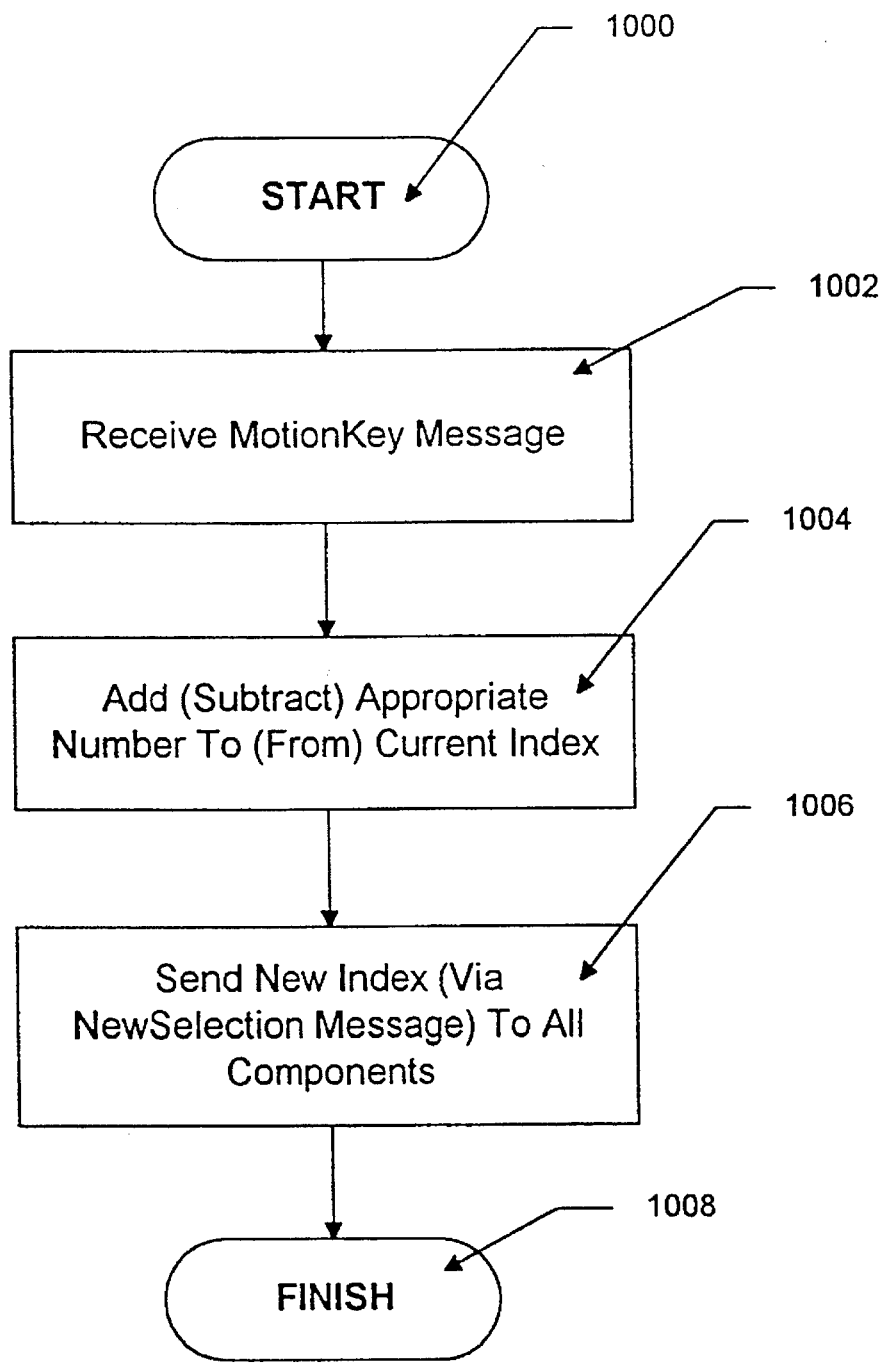
FIG. 10 is a flowchart of an illustrative routine used to process MotionKey messages.

FIG. 10 shows a flowchart of an illustrative routine used to process arrow, page up and page down key messages referred to collectively as MotionKey messages. The routine starts in step 1000 and proceeds to step 1002 where a MotionKey message is received by either the picture browser area or the index box. In step 1004, a new index value is created by adding or subtracting a fixed value from the current index. In the case of the arrow keys, a fixed value of "one" is added to, or subtracted from, the current index. Alternatively, in the case of the page up and page down keys, a fixed number greater than one may be added to, or subtracted from, the current index in order to compute the new index. In step 1006, the new index value is sent, via a NewSelection message to all components. The routine then finishes in step 1008.

Figure 11:
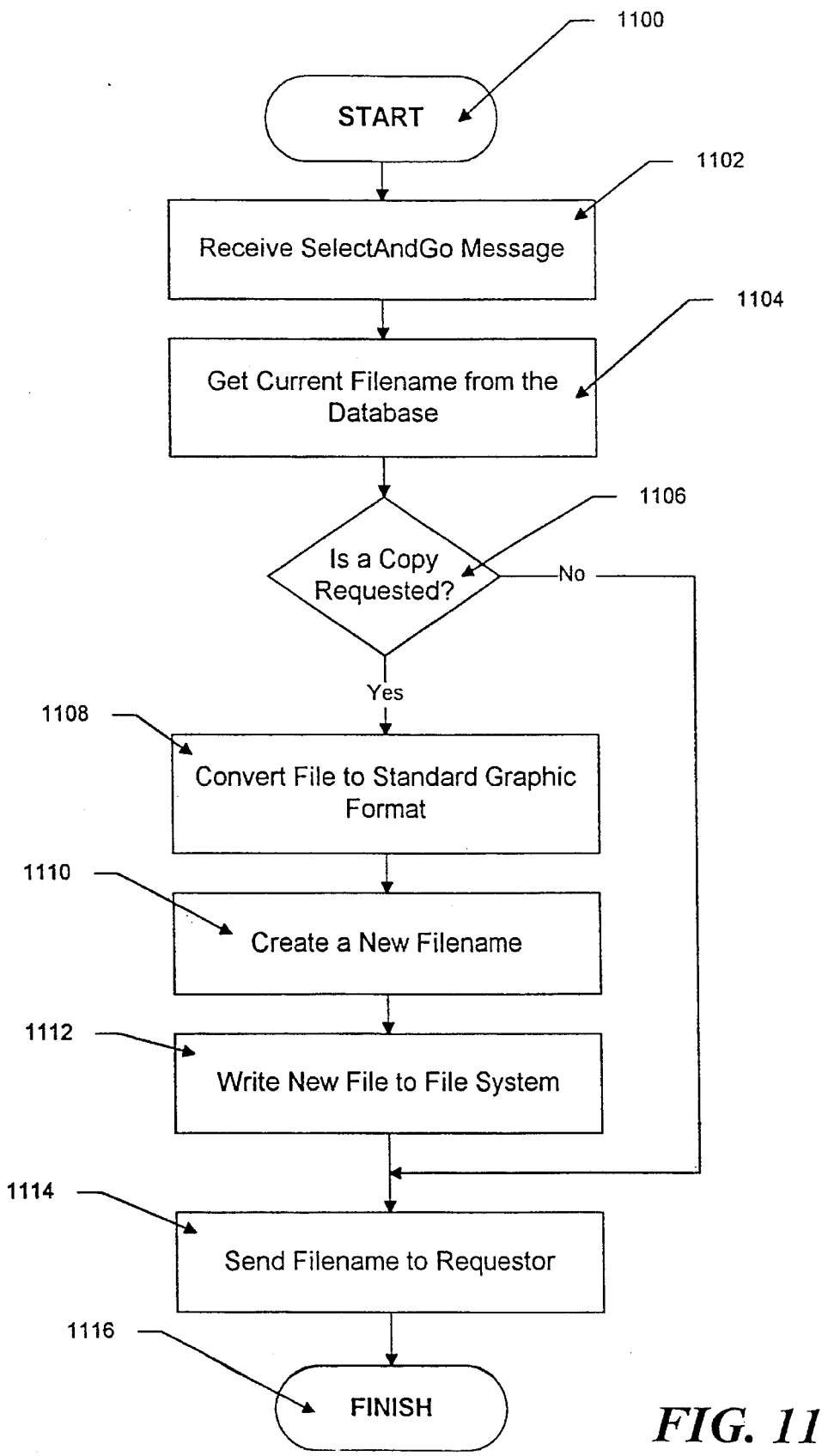
FIG. 11 is a flowchart of an illustrative routine used to process a SelectAndGo message.

FIG. 11 shows the processing of a SelectAndGo message. Such a message, for example, may be issued by the WINDOWS operating system when the user has made a choice of a selected picture. Such a choice can be made for example by using a menu command, clicking on a "choice" button or double-clicking on the desired picture (in the picture browser area) or name (in the index box). Generally, in such a case, an external editor program (called a requester program) is called to edit the file. As previously mentioned, this type of operation allows the picture content to be changed in accordance with the editing format used in the editor. When the requester program is called it receives the filename of the file to be edited.

The SelectAndGo processing routine starts in step 1100 and proceeds to step 1102 where the SelectAndGo message is received by the graphics management system. In step 1104, the file name of the picture associated with the current index is retrieved from the database record. The routine next proceeds to step 1106 where a decision is made whether a copy of the file has been requested by the user or whether the user intends to edit the original file. This information may be obtained by a variety of methods, for example, a check box or radio button may be used in a dialog box to determine whether the original record or copy is to be edited. If, in step 1106, it is determined that the original file is to be edited, the routine proceeds to step 1114 in which the file name is sent to the requester and the routine finishes in step 1116.

Alternatively, if in step 1106, the user has requested a copy of the file then, in step 1108, the original file is converted to standard graphic format for editing purposes. In step 1110, a new file name is created for the new copy. Alternatively, the user may be allowed to name the copy file. In step 1112, the new file is written to the file system using the file name created in step 1110 and, in step 1114, the new file name is sent to the requester program. The routine ends in step 1116.

Figure 12:
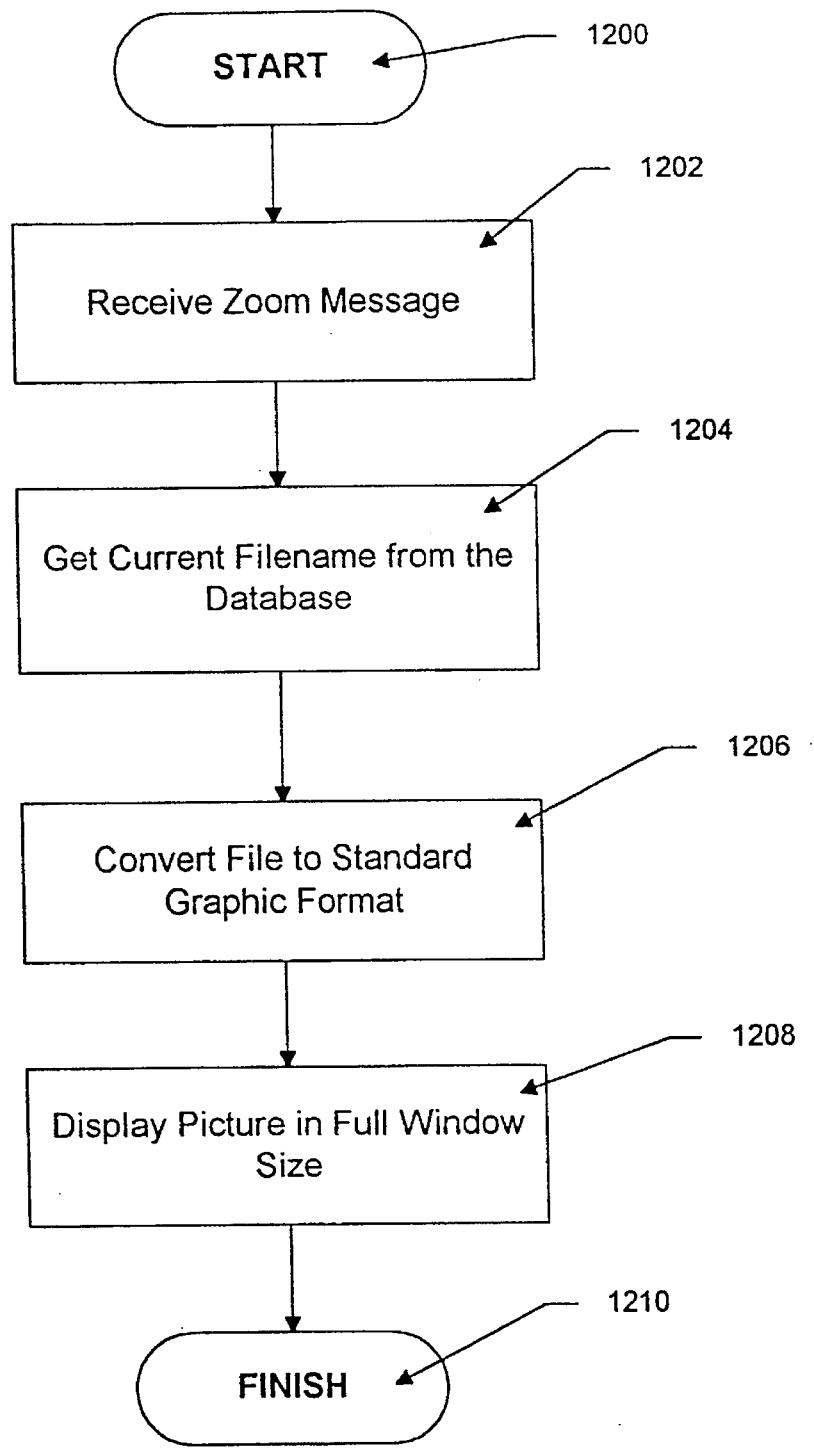
FIG. 12 is a flowchart of an illustrative routine used to process a Zoom message.

FIG. 12 shows an illustrative routine used to process a Zoom message received, via the WINDOWS operating system. Such a Zoom message may, for example, originate in a menu selection or when the user double-dicks on the maximize button found in the upper right corner of the picture browser window. This Zoom message is then forwarded to the command manager 300, via the task communication manager 302. A zoom message causes the currently-selected picture to be expanded to fill picture browser area. In particular, the Zoom message processing routine starts in step 1200 and proceeds to step 1202 where the Zoom message is received. In step 1204, the file name of the currently-selected picture is obtained from the database record. This file name is used in step 1206 to retrieve the file and convert it to a standard graphic format. This conversion allows the file to be expanded to full window size using standard predetermined routines. In step 1208, the expanded picture is re-displayed in the full window size and the routine finishes in step 1210.

Figure 13:
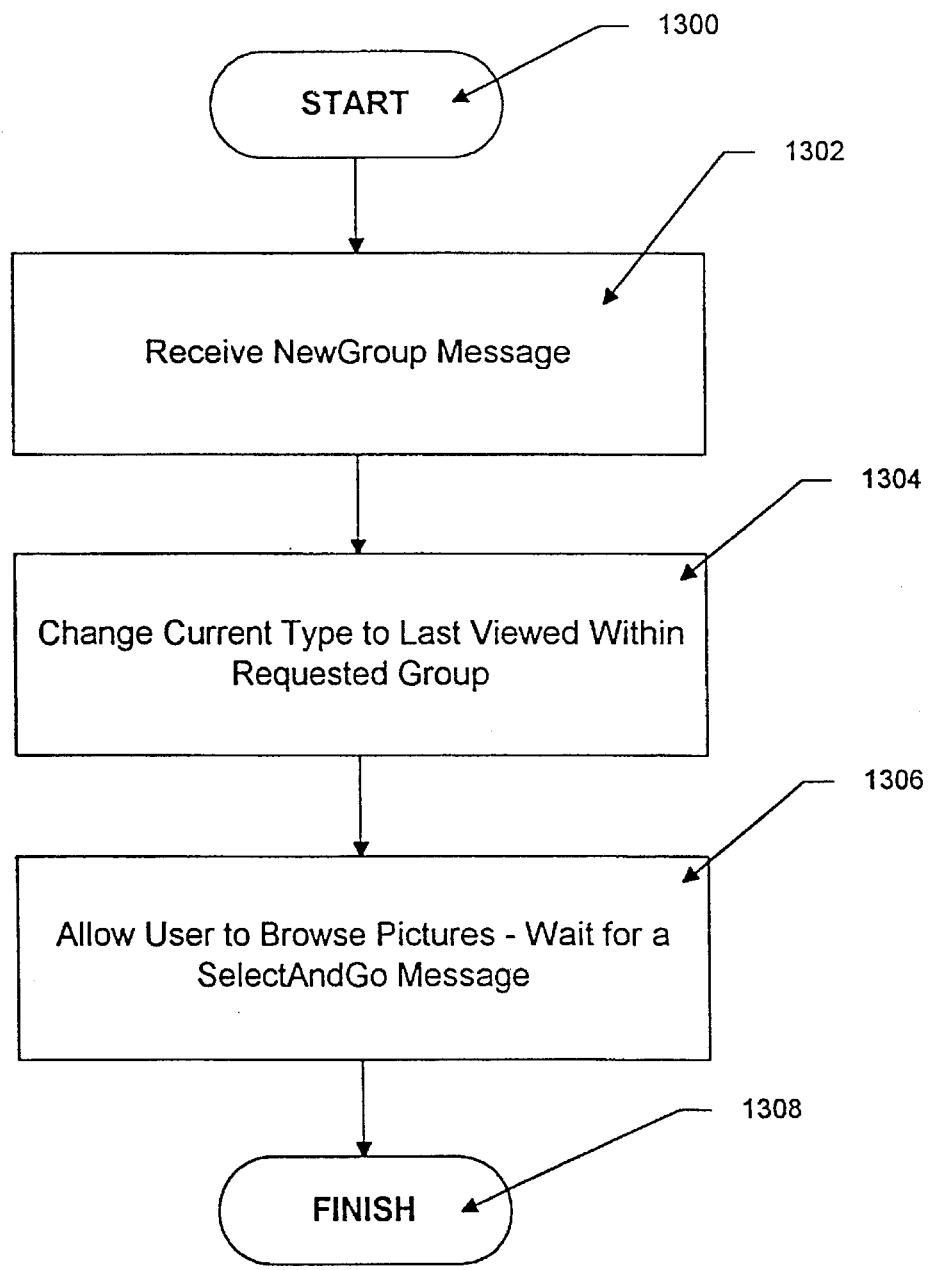
FIG. 13 is a flowchart of an illustrative routine used to process a NewGroup message.

FIG. 13 is an illustrative routine for the processing of a NewGroup message—the routine starts in step 1300 and proceeds to step 1302 where the NewGroup message is received by the graphics management system. The routine then proceeds to step 1304 where the current picture type is changed to the type of the picture last viewed within the requested group. The routine then proceeds to step 1306 where the user is allowed to browse through the pictures in the selected group in the manner previously described. The NewGroup routine then waits for a SelectAndGo message as previously described. When this message is received, it is processed and the routine finishes in step 1308.

Figure 14A:
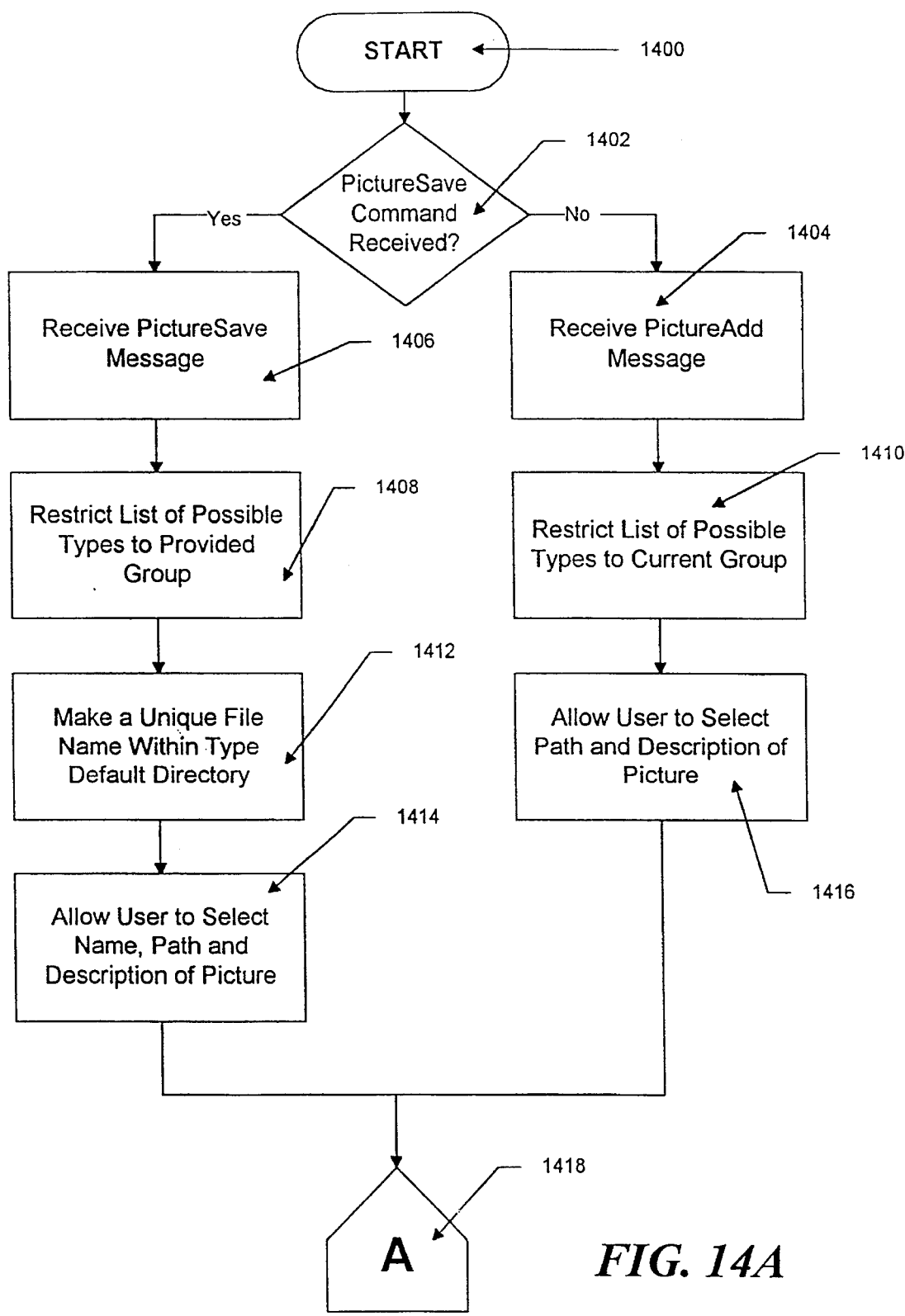
FIGS. 14A and 14B are two sections of a flowchart of an illustrative routine used to process PictureSave and PictureAdd message.
Figure 14B:
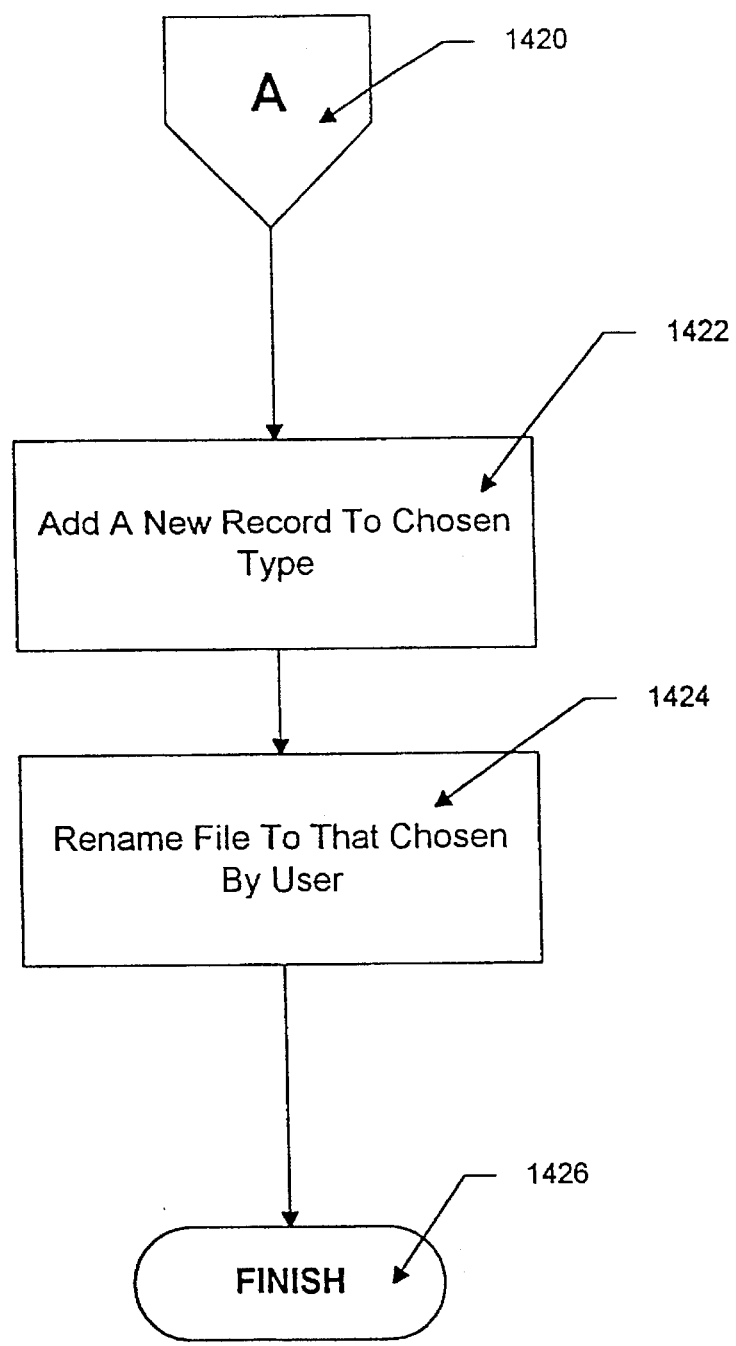

FIGS. 14a and 14b, when aligned vertically, illustrate a flowchart for a routine for the processing of a PictureSave or PictureAdd (save as) message. The routine starts in step 1400 and proceeds to step 1402 where it is determined whether a PictureAdd or PictureSave command has been selected by the user. PictureAdd is a routine used to add an existing picture to the current type and results from a command directly entered by the user, thus, the existing picture name and path are presented to the user as defaults, for example, the picture name and path might be used as defaults in a dialog box used to retrieve the name and path from the user. PictureSave is a command sent by another application when a user of that application desires to save a file by another name. In this latter case, the user does not directly interface with the graphics management system and no default names are available. Therefore, it is necessary to construct a name that is unique within the default directory associated with the current type. The user is allowed to select any type within the original group usually by means of a dialog box.

If a PictureSave command has been received, the routine proceeds to step 1406 where the PictureSave message is received. Generally, a dialog box is opened up at this point to retrieve various pieces of information from the user. This dialog box typically includes a list box or other similar control which allows the user to select a type to be assigned to the file when it is saved. In the case of a PictureSave routine, the list of possible types must be restricted to the list of possible types in the selected group in order to maintain database consistency. This restriction is performed in step 1408. In step 1412, a unique file name is created within the type default directory to prepare for the storing of the file and this name is displayed as a default in the aforementioned dialog box. In step 1414, the user is allowed to select or modify the default name, path and description of the picture (usually by means of the aforementioned dialog box). The routine then proceeds, via off-page connectors 1418 and 1420) to step 1422 where a new record containing the picture is added to the database with the chosen type. The picture file is renamed to the file name chosen by the user (step 1424) and the routine ends in step 1426.

Alternatively, if, in step 1404, it is determined that a PictureAdd command has been received, the routine proceeds to step 1404 where the PictureAdd message is received. As previously mentioned, a dialog box is normally opened in response to this request to retrieve information from the user. In step 14 10, the list in the dialog box of possible types is restricted to the current type and, in step 14 16, the user is allowed to select the name, path and description of the picture, for example, by means of edit fields in the dialog box. As previously mentioned, the existing picture name can be used as a default name in the dialog box. The routine then proceeds, via off-page connectors 14 18 and 1420, to step 1422 where a new record of the chosen type is added to receive the picture. In step 1424, that new record is renamed to the file name chosen by the user and the routine ends in step 1426.

Figure 15:
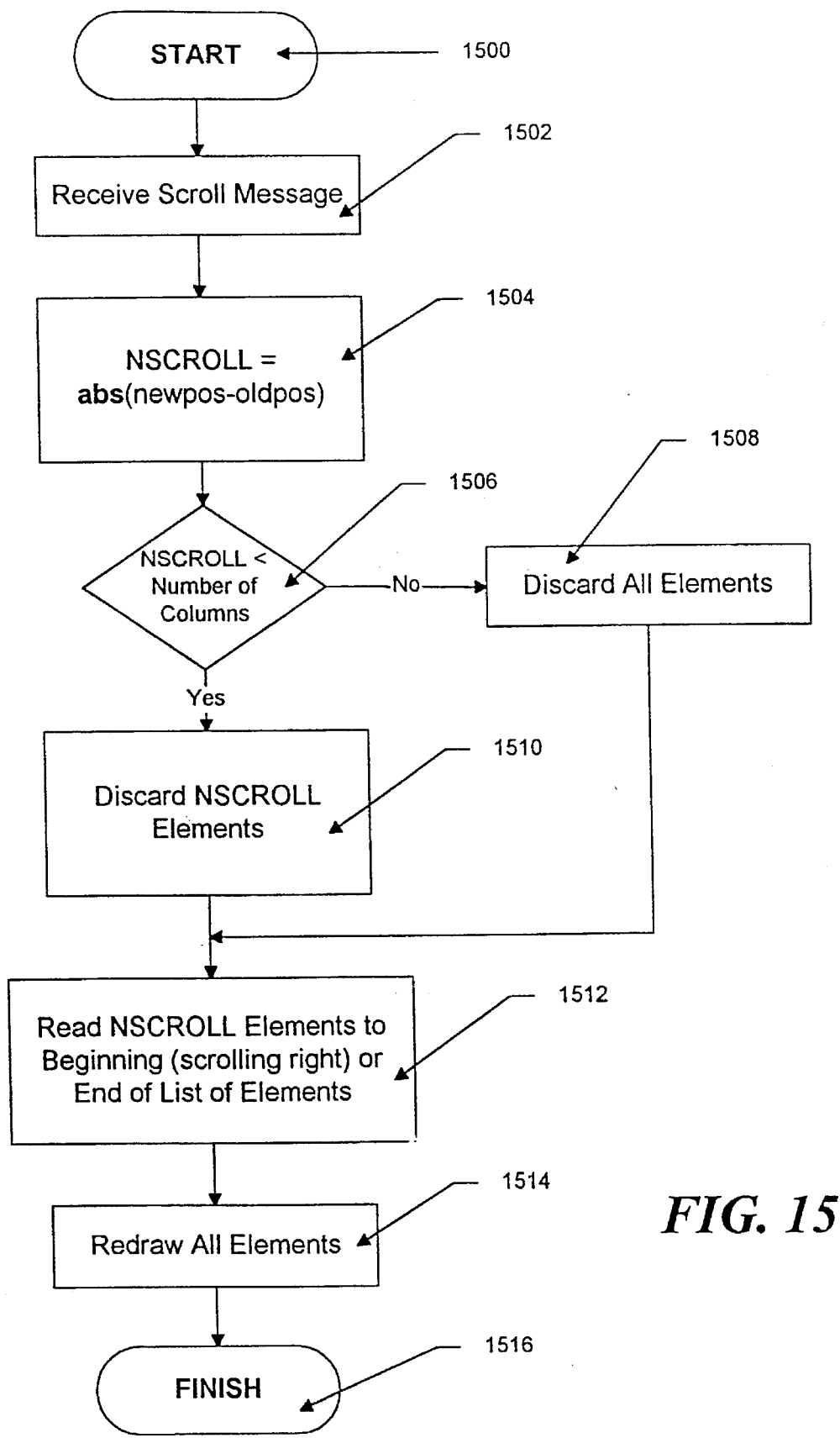
FIG. 15 is a flowchart of an illustrative routine used to process a Scroll message.

FIG. 15 illustrates a routine used to process a Scroll message received by either the picture browser area or the index box. The routine starts in step 1500 and proceeds to step 1502 where the Scroll message is received. In step 1504, a variable called NSCROLL is computed by taking the absolute value of the new computed scroll position minus the old computed scroll position. The variable NSCROLL indicates the number of columns or picture elements which must be scrolled past in order to bring a new selection into the picture browser area. In step 1506, a check is made to determine whether the NSCROLL value is less than the total number of columns currently displayed in the picture browser area. If it is, that means that the new position to which the display is to be scrolled is already on the screen. Accordingly, the routine proceeds to step 1510, where a number of picture elements equal to NSCROLL are discarded. Alternatively, if in step 1506, the number of required scroll positions is greater than the total number of columns, then all picture elements currently displayed are discarded in step 1508.

In either case, the routine proceeds to step 1512 in which NSCROLL new picture elements are read from the database and added to either the beginning of the list of elements or the end (depending on whether the scrolling is to the right or the left, respectively). The routine then proceeds to step 1514 where all picture elements are redrawn to complete the scroll operation in step 1516.

Figure 16:
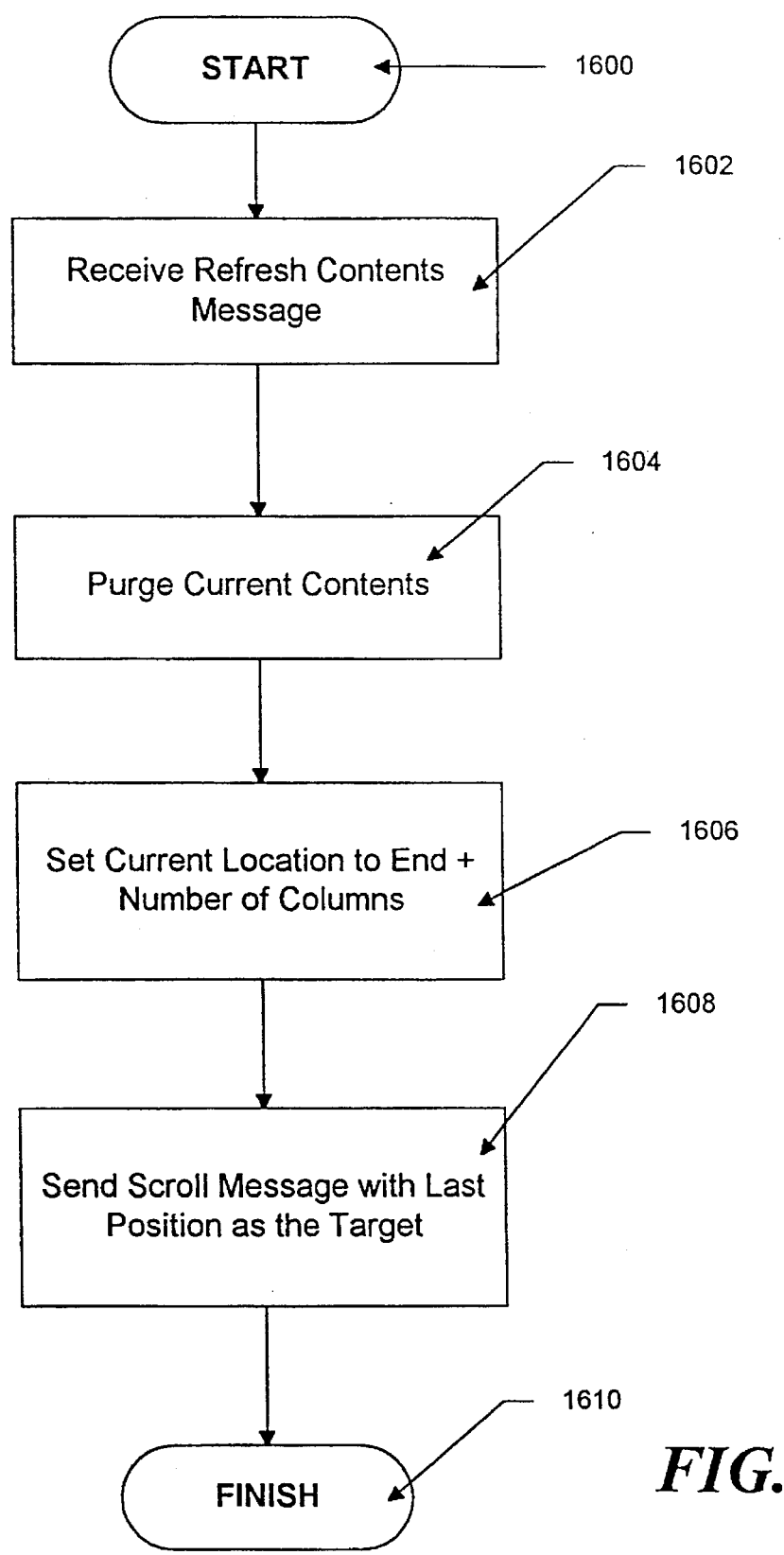
FIG. 16 is a flowchart of an illustrative routine used to process a RefreshContents message.

FIG. 16 illustrates the processing of a RefreshContents message by a graphics management system display element. The routine proceeds in step 1600 to step 1602 where the RefreshContents message is received. In step 1604, the current contents of the display are purged or discarded. The routine then proceeds to step 1606 where the current location is set to the display end plus the total number of columns. In step 1608, a Scroll message is sent to the display element with the last position as the target. Processing of the Scroll message has been previously described. The routine then ends in step 1610.

The foregoing description has been limited to a specific embodiment of this invention. It will be apparent, however, that variations and modifications may be made to the invention, with the attainment of some or all of its advantages. For example, it will be obvious to those skilled in the art that the present invention can be used with various operating systems other than the WINDOWS system as disclosed. Therefore, it is the object of the appended claims to cover all such variations and modifications as come within the true spirit and scope of the invention.

What is claimed is:

1. A graphics management system for organizing a plurality of graphic image files and displaying the graphic images in each of the plurality of graphic image files on a display apparatus, the system comprising:

- a database having a plurality of records, each of the plurality of records being uniquely linked to one of the plurality of graphic images files wherein each of the records comprises:
  - a filename which designates a file location of a graphic image file in which a particular graphic image is stored; and
  - an index name comprising textual information selected by a user to identify the graphic image;
- a database view processor cooperating with the database for creating a selection set based on the textual information in each of the plurality of records; and
- a graphics display processor responsive to the selection set for retrieving graphic images from the graphic images files in the selection set and simultaneously displaying a plurality of the retrieved images and at least a portion of the textual information on the display apparatus.

2. A graphics management system according to claim 1 wherein the plurality of records in the database are organized into a plurality of selection sets.

3. A graphics management system according to claim 1 wherein the graphics display processor comprises an index box generator for displaying the textual information for a first plurality of records and a picture browser area for displaying a second plurality of graphic images.

4. A graphics management system according to claim 3 wherein the graphics display processor further comprises first scroll apparatus for changing the second plurality of images displayed in the picture browser area.

5. A graphics management system according to claim 3 wherein the graphics display processor further comprises second scroll apparatus for changing the textual information displayed by the index box generator.

6. A graphics management system according to claim 3 wherein the picture browser area displays a second plurality of images which is less than the plurality of graphic image files and the graphics display processor retrieves only graphic images from the graphic image files corresponding to the second plurality of images.

7. A graphics management system according to claim 3 wherein the index box generator displays textual information for a first plurality of records which is less than the plurality of graphic image files.

8. A graphics management system responsive to user commands for organizing a plurality of graphic images and displaying the graphic images on a display apparatus, each of the plurality of images being stored in a respective graphic image file, the system comprising:

- a database having a plurality of records, each of the plurality of records comprising:
  - a filename which designates a file location of a respective graphic file in which a particular graphic image is stored; and
  - an index name comprising textual information entered by a user to identify the graphic image;
- a database view processor cooperating with the database for selecting selected ones of the plurality of records based upon the index names in said plurality of records and for creating an index containing a list of of the selected records in a predetermined order; and
- a graphics display processor responsive to the index for retrieving graphic images from the records in the subset in the order determined by the index file and simultaneously displaying the retrieved graphic images on the display apparatus.

9. A graphics management system according to claim further comprising manual entry apparatus responsive to the user commands for receiving the index name and entering the index name into one of said plurality of records and for entering each of the plurality of records into a selection set based on the index name.

10. A graphics management system according to claim wherein each selection set is organized into selection subsets by information contained within each record in the selection set.

11. A graphics management system according to claim 10 wherein each record includes a type code.

12. A graphics management system according to claim 11 wherein each the type code included in each record is used to place each record in a selection subset.

13. A graphics management system according to claim further comprising file management apparatus cooperating with the manual entry apparatus and with the database for creating a new record and entering a filename into the new record and for entering an index name into the new record and for storing the new record.

14. A graphics management system according to claim 8 wherein each of the plurality of records further includes a description for storing textual information.

15. A graphics management system according to claim 14 wherein the database view processor comprises selection apparatus cooperating with the database for selecting at least one of the plurality of records based on the textual information in the index name and in the description.

16. A graphics management system according to claim 8 wherein the graphics display processor comprises an index box generator for displaying index names for a first plurality of records less than a total number of records and a picture browser area for displaying a second plurality of graphic images less than the total number of records.

17. A graphics management system according to claim 16 wherein the graphics display processor further comprises first scroll apparatus for changing the second plurality of images displayed in the picture browser area.

18. A graphics management system according to claim 16 wherein the graphics display processor further comprises second scroll apparatus for changing a first plurality of index names displayed by the index box generator.

19. A graphics management system responsive to user commands for organizing a plurality of graphic images and displaying the graphic images on a display apparatus, each of the plurality of images being stored in a respective graphic image file, the system comprising:

- a database having a plurality of records, each of the plurality of records comprising:
  - a filename which designates a file location of a respective graphic file in which a particular graphic image is stored; and
  - an index name comprising textual information entered by a user to identify the graphic image;
- a database view processor cooperating with the database for selecting a subset of the plurality of records based upon the textual information and for creating an index containing a list of the selected records in the subset in a predetermined order;
- a graphics display processor responsive to the index for retrieving graphic images from the records in the subset in the order determined by the index and displaying the retrieved graphic images on the display apparatus, wherein the graphics display processor comprises an index box generator for displaying index names for a portion of the records in the subset and a picture browser area for displaying a plurality of the retrieved images;

selection apparatus for selecting one of the images displayed in the picture browser area; and an index name display apparatus responsive to the selection of one of the images for controlling the index box generator to display an index name corresponding to the selected on of the images.

20. A graphics management system responsive to user commands for organizing a plurality of graphic images and displaying the graphic images on a display apparatus, each of the plurality of images being stored in a respective graphic image file, the system comprising:

a database having a plurality of records, each of the plurality of records comprising:

a filename which designates a file location of a respective graphic file in which a particular graphic image is stored; and an index name comprising textual information entered by a user to identify the graphic image;

a database view processor cooperating with the database for selecting a subset of the plurality of records based upon the index name and for creating an index containing a list of the selected records in the subset in a predetermined order;

a graphics display processor responsive to the index for retrieving graphic images from the records in the subset in the order determined by the index and displaying the retrieved graphic images on the display apparatus, wherein the graphics display processor comprises an index box generator for displaying index names for a portion of the records in the subset and a picture browser area for simultaneously displaying a plurality of the retrieved images.;

selection apparatus for selecting one of the index names displayed by the index box generator, and picture display apparatus responsive to the selection of one of the index names for controlling the picture browser area to display a graphic image corresponding to the selected index name.

21. A graphics management system responsive to user commands for organizing a plurality of graphic images having a total number of images and displaying the graphic images on a display apparatus, each of the plurality of graphic images being stored in a respective graphic image file, the system comprising:

a database having a plurality of records, each of the plurality of records including a filename which designates the file location of a graphic image file in which a particular graphic image is stored;

a dialog box responsive to user commands for receiving an index name associated with each of the records, wherein the index name comprises text information entered by a user to identify a particular graphic image;

a database view processor cooperating with the database for selecting at least one of the plurality of records and for creating index containing a list of selected records in an order determined by sorting the index name associated with each of the selected records;

a combo box for displaying index names associated with a plurality of the selected records;

a picture browser window for displaying a plurality of graphic images of the selected records and for enabling a user to scroll through the plurality of graphic images; and a graphics display processor responsive to the index for retrieving the graphic images from the selected records in the order determined by the index.

22. A graphics management system according to claim 21 wherein each of the plurality of records further includes a description for storing textual information and wherein the database view processor comprises selection apparatus cooperating with the database for selecting at least one of the plurality of records based on the textual information in the index name and in the description.

23. A graphics management system according to claim 21 wherein the picture browser window comprises a scroll bar control for changing the plurality of graphic images displayed in the picture browser window.

24. A graphics management system according to claim wherein the combo box comprises a scroll bar control for changing the index names displayed in the combo box.

25. A method for organizing and displaying a plurality of graphic images, wherein each of the graphic images is stored in a respective graphic image file, the method comprising the steps of:

A. creating a database having a plurality of records, each of the plurality of records comprising:

a filename which designates a file location of a graphic image file in which a particular graphic image is stored; and an index name comprising textual information entered by a user to identify the graphic image;

B. selecting a set of the plurality of records and ordering the selected set based on the textual information in the index name of each of the plurality of records;

C. determining a number of graphic images which are to be displayed;

D. retrieving the number of graphic images determined in step C from the graphic image files in the selected set; and E. simultaneously displaying a plurality of the retrieved images and at least a portion of the textual information on a display apparatus in the order determined by the set.

26. A method according to claim 25 wherein step A comprises the step of:

A1. organizing the plurality of records in the database into a plurality of selection sets.

27. A method according to claim 25 wherein step E comprises the step of scrolling the textual information in order to display the textual information from all of the records in the selected set.

28. A method according to claim 25 wherein step E comprises the step of scrolling the plurality of graphic images in order to display the images associated with all of the records in the selected set.

29. A method according to claim 25 further comprising the steps of:

F. selecting one of the images displayed on the display apparatus in step E; and G. scrolling the textual information in order to display the textual information from the record associated with the image selected in step F.

30. A method for organizing a plurality of graphic images and displaying the graphic images on a display apparatus, each of the plurality of graphic images being stored in a respective graphic image file, the method comprising the steps of:

A. creating a database having a plurality of records, each of the plurality of records comprising:
   a filename which designates a file location of a graphic image file in which a particular graphic image is stored; and
   an index name comprising textual information entered by a user to identify the graphic image;
B. selecting a subset of the plurality of records;
C. creating an index containing a list of the records in the subset in an order determined by the index name associated with each of the records in the subset;
D. retrieving graphic images from the records in the subset in the order determined by the index; and
E. displaying the retrieved images on the display apparatus.

31. A method according to claim 30 wherein step A comprises the steps of:
   A1. receiving an index name; and
   A2. entering the received index name into one of the plurality of records.

32. A method according to claim 31 wherein step A1 comprises the step of organizing the plurality of records into a plurality of selection sets based on information in each of the plurality of records.

33. A method according to claim 31 wherein step A1 comprises the step of organizing the plurality of records into a plurality of selection sets based on information in the index name in each of the plurality of records.

34. A method according to claim 31 wherein step A1 comprises the step of organizing the plurality of records into a plurality of selection sets based on a type code in each of the plurality of records.

35. A method according to claim 31 wherein step A2 comprises the steps of:
   A2A. creating a new record;
   A2B. entering a filename into the new record;
   A2C. entering an index name into the new record; and
   A2D. storing the new record.

36. A method according to claim 30 wherein each of the plurality of records further includes a description for storing textual information and wherein step B comprises the step of selecting at least one of the plurality of records based on the textual information in the index name and in the description.

37. A method according to claim 30 wherein step E comprises the steps of:
   E1. displaying index names for a first plurality of records in an index box, the first plurality being less than the total number of records selected in step B; and
   E2. displaying a second plurality of graphic images in a picture browser area, the second plurality being less than the total number of records selected in step B.

38. A method according to claim 37 wherein step E1 comprises the step of:
   E1A. scrolling the index names displayed in the index box so that index names associated with all of the plurality of records selected in step B can be displayed.

39. A method according to claim 37 wherein step E2 comprises the step of:
   E2A. scrolling the plurality of images displayed in the picture browser area so that all images associated with the plurality of records selected in step B can be displayed.

40. A method according to claim 37 further comprising the steps of:
   F. selecting one of the index names displayed in the index box in order to select one of the plurality of records; and
   G. scrolling the plurality of images displayed in the picture browser area so that an image associated with the one record selected in step F can be displayed in the picture browser area.

41. A method according to claim 37 further comprising the steps of:
   H. selecting one of the images displayed in the picture browser area in order to select one of the plurality of records; and
   I. scrolling the plurality of index names displayed by the index box so that an index name associated with the one record selected in step H can be displayed in the index box.

42. A method for organizing a plurality of graphic images and displaying the graphic images on a display apparatus, each of the plurality of images being stored in a respective graphic image file, the method comprising the steps of:
   A. creating a database having a plurality of records, each of the plurality of records including a filename which designates a file location of a graphic image file in which particular graphic image is stored;
   B. generating a dialog box which contains controls responsive to user commands for receiving an index name associated With each of the records, wherein the index name comprises text information entered by a user to identify a particular graphic image;
   C. entering an index name for each of the plurality of records;
   D. creating a selection set comprising at least one of the plurality of records;
   E. creating an index containing a list of records in the selection set in an order determined by the index name associated with each of the selected records in the selection set;
   F. creating a combo box for displaying index names associated with a plurality of records in the selection set;
   G. creating a picture browser window for displaying a plurality of graphic images of the selected records and enabling a user to scroll through the plurality of graphic images; and
   H. retrieving the graphic images from the selected records in the order determined by the index for display in the picture browser window.

43. A method according to claim 42 wherein each of the plurality of records further includes a description for storing textual information and wherein step D comprises the step of selecting at least one of the plurality of records based on the textual information in the index name and in the description.

44. A method according to claim 42 wherein step F comprises the step of:
   F1. creating a scroll bar control for the combo box for changing the displayed index names displayed in the combo box.

45. A method according to claim 42 wherein step G comprises the step of:
   G1. creating a scroll bar control for the picture browser window for changing the displayed plurality of images displayed in the picture browser window.

\* \* \* \* \*

UNITED STATES PATENT AND TRADEMARK OFFICE
CERTIFICATE OF CORRECTION

PATENT NO. : 5,517,605
DATED : May 14, 1996
INVENTOR(S) : Richard J. Wolf

It is certified that error appears in the above-identified patent and that said Letters Patent is hereby corrected as shown below:

Column 16,
Line 3, change "to claim further" to -- to claim 8 further --.
Line 9, change "to claim wherein" to -- to claim 9 wherein --.
Line 18, change "to claim further" to -- to claim 9 further --.

Column 17,
Line 10, change "selected on of" to -- selected one of --.

Column 18,
Line 17, change "to claim wherein" to -- to claim 21 wherein --.

Column 19,
Line 14, change "displaying" to -- simultaneously displaying --.

Signed and Sealed this

Twenty-third Day of October, 2001

*Attest:*

NICHOLAS P. GODICI
*Attesting Officer*   *Acting Director of the United States Patent and Trademark Office*